US011755680B2

(12) United States Patent
Jagota et al.

(10) Patent No.: US 11,755,680 B2
(45) Date of Patent: Sep. 12, 2023

(54) ADAPTIVE RECOGNITION OF ENTITIES

(71) Applicant: salesforce.com, inc., San Francisco, CA (US)

(72) Inventors: Arun Kumar Jagota, Sunnyvale, CA (US); Ajitesh Jain, San Mateo, CA (US)

(73) Assignee: Salesforce, Inc., San Francisco, CA (US)

( * ) Notice: Subject to any disclaimer, the term of this patent is extended or adjusted under 35 U.S.C. 154(b) by 634 days.

(21) Appl. No.: 16/749,234

(22) Filed: Jan. 22, 2020

(65) Prior Publication Data

US 2021/0224482 A1 Jul. 22, 2021

(51) Int. Cl.
| | |
|---|---|
| *G06F 16/958* | (2019.01) |
| *G06F 40/284* | (2020.01) |
| *G06N 5/02* | (2023.01) |
| *G06F 16/901* | (2019.01) |
| *G06F 16/903* | (2019.01) |
| *G06F 18/2415* | (2023.01) |

(52) U.S. Cl.
CPC ......... *G06F 16/986* (2019.01); *G06F 16/901* (2019.01); *G06F 16/90344* (2019.01); *G06F 18/2415* (2023.01); *G06F 40/284* (2020.01); *G06N 5/02* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |

(Continued)

FOREIGN PATENT DOCUMENTS

| | | | | |
|---|---|---|---|---|
| EP | 2664997 A2 | * | 11/2013 | ........... G06F 17/278 |
| SG | 171508 A1 | * | 6/2011 | |

OTHER PUBLICATIONS

Houfeng Wang "Cross-Document Transliterated Personal Name Coreference Resolution", FSKD 2005, LNAI 3614, pp. 11-20, 2005.© Springer-Verlag Berlin Heidelberg 2005. (Year: 2005).*

(Continued)

*Primary Examiner* — Uyen T Le
(74) *Attorney, Agent, or Firm* — Dergosits & Noah LLP; Todd A. Noah

(57) ABSTRACT

A system receives a record which includes a string and separates the string into a number of tokens, including a token and another token. The system identifies a pattern that includes an entity, another entity, and a number of entities that equals the number of tokens, and another pattern that includes the same number of entities as the number of tokens. The system determines a combined probability that combines a probability based on the number of entries in the entity's dictionary which stores the token, and another probability based on a number of character types in the other entity that match characters in the other token. If the combined probability associated with the pattern is greater than another combined probability associated with the other pattern, the system matches the record to a system record based on recognizing the token as the entity and the other token as the other entity.

20 Claims, 32 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,042,662 B2 * | 5/2015 | Aerts ................. G06T 7/11 382/220 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0243832 A1 * | 10/2008 | Adams ................. G06F 16/334 707/999.005 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0106821 A1 * | 5/2011 | Hassanzadeh .......... G06F 40/30 707/794 |
| 2012/0066160 A1 * | 3/2012 | Jagota ................. G06Q 30/02 706/12 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0280353 A1 * | 9/2014 | Delaney ................. G06F 16/367 707/794 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

(56) References Cited

U.S. PATENT DOCUMENTS

2018/0032930 A1\* 2/2018 Kolb ................... G06F 40/253
2021/0342539 A1\* 11/2021 Zhang ................. G06F 40/253

OTHER PUBLICATIONS

Ji, Heng, and Ralph Grishman. "Applying coreference to improve name recognition." In Proceedings of the Conference on Reference Resolution and its Applications, pp. 32-39. 2004. (Year: 2004).*
Nguyen, Dat Ba, et al. "AIDA-light: High-Throughput Named-Entity Disambiguation." LDOW 1184 (2014) (Year: 2014).*
Riaz, K. (Jul. 2010). Rule-based named entity recognition in Urdu. In Proceedings of the 2010 named entities workshop (pp. 126-135) (Year: 2010).*
Schall, M., Schambach, M. P., & Franz, M. O. (Apr. 2016). Increasing robustness of handwriting recognition using character n-gram decoding on large lexica. In 2016 12th IAPR Workshop on Document Analysis Systems (DAS) (pp. 156-161). IEEE (Year: 2016).*

\* cited by examiner

FIG. 1A        100

```xml
<entityParser version="2.0" xmlns:xsi="http://www.w3.org/2001/XMLSchema-instance"
        xsi:noNamespaceSchemaLocation="../parser_definition.xsd">

<preCleanRegEx><![CDATA[,]]></preCleanRegEx>
  <tokenSeparatorsRegEx><![CDATA[[\p{Cntrl}\s]+]]></tokenSeparatorsRegEx>

<patternsSource>patterns.tsv</patternsSource>

<entities>
    <entity>
      <entityName>street_keyword</entityName>
      <mapTo>street_suffix</mapTo>
      <dataProvider>
        <dataProviderName>FileValueStore</dataProviderName>
        <dataProviderArgs>
          <dataProviderArg>street_suffix.txt</dataProviderArg>
        </dataProviderArgs>
      </dataProvider>

</entity>
    <entity>
      <entityName>DIRECTIONAL_WORD</entityName>
      <dataProvider>
        <dataProviderName>FileValueStore</dataProviderName>
        <dataProviderArgs>
          <dataProviderArg>directional_word.txt</dataProviderArg>
        </dataProviderArgs>
      </dataProvider>
    </entity>
    <entity>
      <entityName>street_name_word</entityName>
      <regExNames>
        <regExName>alpha_word</regExName>
        <regExName>alpha_word_hyphenated</regExName>
        <regExName>alpha_word_underscore_alpha_word</regExName>
      </regExNames>
      <likelihood>0.00000218829</likelihood>
    </entity>
    <entity>
      <entityName>street_number</entityName>
      <regExNames>
        <regExName>number</regExName>
```
...

FIG. 1B    100

```xml
...
            <regExName>digit_alpha_char</regExName>
            <regExName>number_range</regExName>
        </regExNames>
        <likelihood>0.0001</likelihood>
    </entity>
    <entity>
        <entityName>po_box_number</entityName>
        <mapTo>pobox_number</mapTo>
        <regExNames>
            <regExName>number</regExName>
        </regExNames>
        <likelihood>0.0001</likelihood>
    </entity>
</entities>

<regExDefinitions>
    <regExDefinition>
        <regExName>alpha_word</regExName>
        <regExPattern><![CDATA[^[a-z][a-z]+\.?$]]></regExPattern>
    </regExDefinition>
    <regExDefinition>
        <regExName>alpha_word_hyphenated</regExName>
        <regExPattern><![CDATA[^[a-z]+-[a-z]+(?:-[a-z]+)?\.?$]]></regExPattern>
    </regExDefinition>
    <regExDefinition>
        <regExName>alpha_word_underscore_alpha_word</regExName>
        <regExPattern><![CDATA[^[a-z]+_[a-z]+\.?$]]></regExPattern>
    </regExDefinition>
    <regExDefinition>
        <regExName>number</regExName>
        <regExPattern><![CDATA[^\d+$]]></regExPattern>
    </regExDefinition>
    <regExDefinition>
        <regExName>number_range</regExName>
        <regExPattern><![CDATA[^\d+-\d+$]]></regExPattern>
    </regExDefinition>
    <regExDefinition>
        <regExName>digit_alpha_char</regExName>
        <regExPattern><![CDATA[^\d-?[a-z]$]]></regExPattern>
    </regExDefinition>
</regExDefinitions>
</entityParser>
```

FIG. 3A

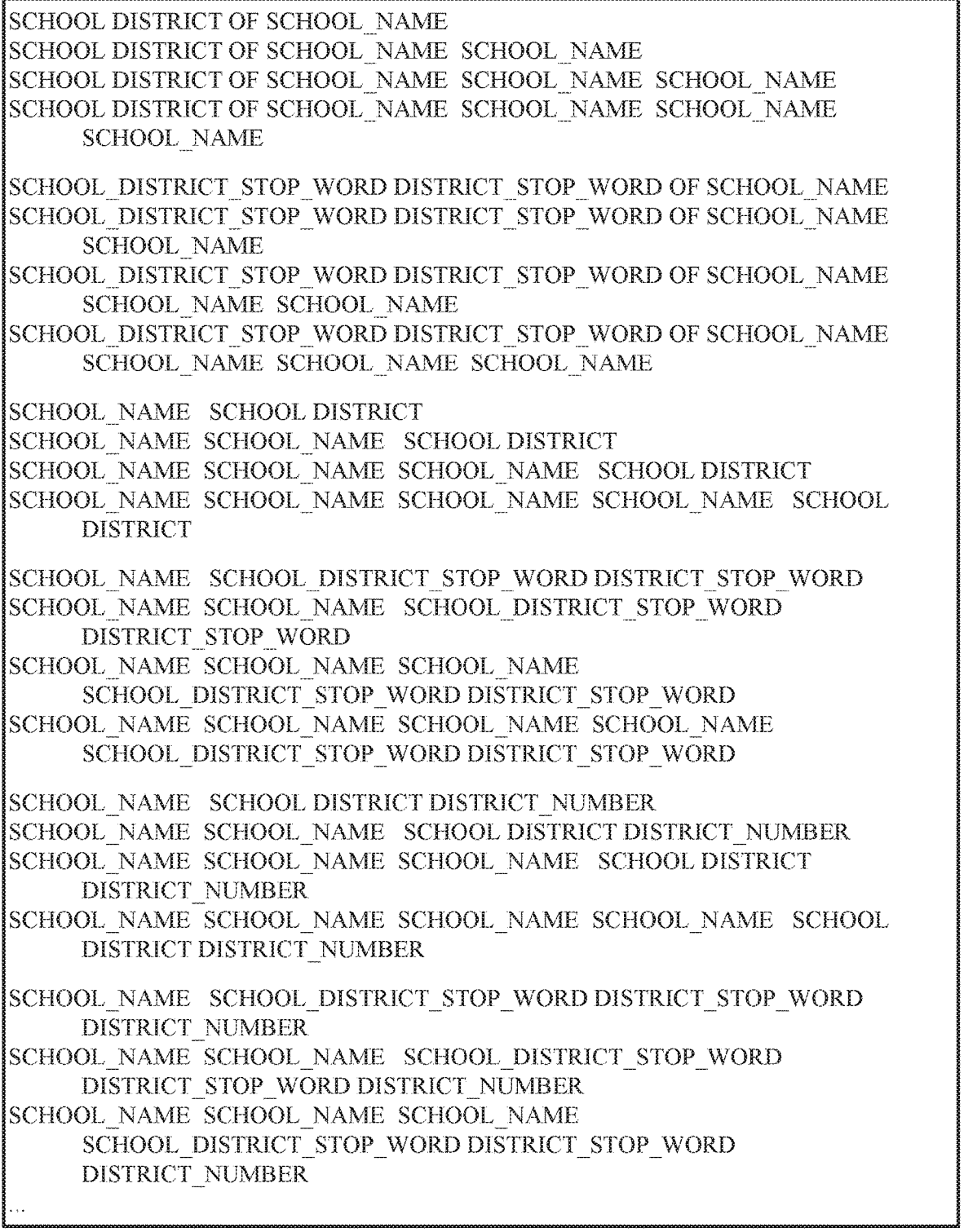

SCHOOL DISTRICT OF SCHOOL_NAME
SCHOOL DISTRICT OF SCHOOL_NAME SCHOOL_NAME
SCHOOL DISTRICT OF SCHOOL_NAME SCHOOL_NAME SCHOOL_NAME
SCHOOL DISTRICT OF SCHOOL_NAME SCHOOL_NAME SCHOOL_NAME
    SCHOOL_NAME

SCHOOL_DISTRICT_STOP_WORD DISTRICT_STOP_WORD OF SCHOOL_NAME
SCHOOL_DISTRICT_STOP_WORD DISTRICT_STOP_WORD OF SCHOOL_NAME
    SCHOOL_NAME
SCHOOL_DISTRICT_STOP_WORD DISTRICT_STOP_WORD OF SCHOOL_NAME
    SCHOOL_NAME SCHOOL_NAME
SCHOOL_DISTRICT_STOP_WORD DISTRICT_STOP_WORD OF SCHOOL_NAME
    SCHOOL_NAME SCHOOL_NAME SCHOOL_NAME

SCHOOL_NAME  SCHOOL DISTRICT
SCHOOL_NAME SCHOOL_NAME  SCHOOL DISTRICT
SCHOOL_NAME SCHOOL_NAME SCHOOL_NAME  SCHOOL DISTRICT
SCHOOL_NAME SCHOOL_NAME SCHOOL_NAME SCHOOL_NAME  SCHOOL
    DISTRICT

SCHOOL_NAME  SCHOOL_DISTRICT_STOP_WORD DISTRICT_STOP_WORD
SCHOOL_NAME SCHOOL_NAME  SCHOOL_DISTRICT_STOP_WORD
    DISTRICT_STOP_WORD
SCHOOL_NAME SCHOOL_NAME SCHOOL_NAME
    SCHOOL_DISTRICT_STOP_WORD DISTRICT_STOP_WORD
SCHOOL_NAME SCHOOL_NAME SCHOOL_NAME SCHOOL_NAME
    SCHOOL_DISTRICT_STOP_WORD DISTRICT_STOP_WORD

SCHOOL_NAME  SCHOOL DISTRICT DISTRICT_NUMBER
SCHOOL_NAME SCHOOL_NAME  SCHOOL DISTRICT DISTRICT_NUMBER
SCHOOL_NAME SCHOOL_NAME SCHOOL_NAME  SCHOOL DISTRICT
    DISTRICT_NUMBER
SCHOOL_NAME SCHOOL_NAME SCHOOL_NAME SCHOOL_NAME  SCHOOL
    DISTRICT DISTRICT_NUMBER

SCHOOL_NAME  SCHOOL_DISTRICT_STOP_WORD DISTRICT_STOP_WORD
    DISTRICT_NUMBER
SCHOOL_NAME SCHOOL_NAME  SCHOOL_DISTRICT_STOP_WORD
    DISTRICT_STOP_WORD DISTRICT_NUMBER
SCHOOL_NAME SCHOOL_NAME SCHOOL_NAME
    SCHOOL_DISTRICT_STOP_WORD DISTRICT_STOP_WORD
    DISTRICT_NUMBER
...

FIG. 3B    300

```
...
SCHOOL_NAME SCHOOL_NAME SCHOOL_NAME SCHOOL_NAME
      SCHOOL_DISTRICT_STOP_WORD DISTRICT_STOP_WORD
      DISTRICT_NUMBER
SCHOOL_NAME  SCHOOL DISTRICT DISTRICT_NUMBER DISTRICT_NUMBER
SCHOOL_NAME SCHOOL_NAME  SCHOOL DISTRICT DISTRICT_NUMBER
      DISTRICT_NUMBER
SCHOOL_NAME SCHOOL_NAME SCHOOL_NAME  SCHOOL DISTRICT
      DISTRICT_NUMBER DISTRICT_NUMBER
SCHOOL_NAME SCHOOL_NAME SCHOOL_NAME SCHOOL_NAME  SCHOOL
      DISTRICT DISTRICT_NUMBER DISTRICT_NUMBER

SCHOOL_NAME  SCHOOL_DISTRICT_STOP_WORD DISTRICT_STOP_WORD
      DISTRICT_NUMBER DISTRICT_NUMBER
SCHOOL_NAME SCHOOL_NAME  SCHOOL_DISTRICT_STOP_WORD
      DISTRICT_STOP_WORD DISTRICT_NUMBER DISTRICT_NUMBER
SCHOOL_NAME SCHOOL_NAME SCHOOL_NAME
      SCHOOL_DISTRICT_STOP_WORD DISTRICT_STOP_WORD
      DISTRICT_NUMBER DISTRICT_NUMBER
SCHOOL_NAME SCHOOL_NAME SCHOOL_NAME SCHOOL_NAME
      SCHOOL_DISTRICT_STOP_WORD DISTRICT_STOP_WORD
      DISTRICT_NUMBER DISTRICT_NUMBER

SCHOOL_NAME  TYPE SCHOOL_DISTRICT_STOP_WORD DISTRICT_STOP_WORD
SCHOOL_NAME SCHOOL_NAME  TYPE SCHOOL_DISTRICT_STOP_WORD
      DISTRICT_STOP_WORD
SCHOOL_NAME SCHOOL_NAME SCHOOL_NAME  TYPE
      SCHOOL_DISTRICT_STOP_WORD DISTRICT_STOP_WORD
SCHOOL_NAME SCHOOL_NAME SCHOOL_NAME SCHOOL_NAME  TYPE
      SCHOOL_DISTRICT_STOP_WORD DISTRICT_STOP_WORD

SCHOOL_NAME  TYPE SCHOOL DISTRICT
SCHOOL_NAME SCHOOL_NAME  TYPE SCHOOL DISTRICT
SCHOOL_NAME SCHOOL_NAME SCHOOL_NAME  TYPE SCHOOL DISTRICT
SCHOOL_NAME SCHOOL_NAME SCHOOL_NAME SCHOOL_NAME  TYPE
      SCHOOL DISTRICT

SCHOOL_NAME  TYPE SCHOOL_DISTRICT_STOP_WORD DISTRICT_STOP_WORD
SCHOOL_NAME SCHOOL_NAME  TYPE SCHOOL_DISTRICT_STOP_WORD
      DISTRICT_STOP_WORD
SCHOOL_NAME SCHOOL_NAME SCHOOL_NAME  TYPE
      SCHOOL_DISTRICT_STOP_WORD DISTRICT_STOP_WORD
...
```

```
...
SCHOOL_NAME SCHOOL_NAME SCHOOL_NAME SCHOOL_NAME TYPE
    SCHOOL_DISTRICT_STOP_WORD DISTRICT_STOP_WORD
SCHOOL_NAME TYPE SCHOOL DISTRICT DISTRICT_NUMBER
SCHOOL_NAME SCHOOL_NAME TYPE SCHOOL DISTRICT DISTRICT_NUMBER
SCHOOL_NAME SCHOOL_NAME SCHOOL_NAME TYPE SCHOOL DISTRICT
    DISTRICT_NUMBER
SCHOOL_NAME SCHOOL_NAME SCHOOL_NAME SCHOOL_NAME TYPE
    SCHOOL DISTRICT DISTRICT_NUMBER

SCHOOL_NAME TYPE SCHOOL_DISTRICT_STOP_WORD DISTRICT_STOP_WORD
    DISTRICT_NUMBER
SCHOOL_NAME SCHOOL_NAME TYPE SCHOOL_DISTRICT_STOP_WORD
    DISTRICT_STOP_WORD DISTRICT_NUMBER
SCHOOL_NAME SCHOOL_NAME SCHOOL_NAME TYPE
    SCHOOL_DISTRICT_STOP_WORD DISTRICT_STOP_WORD
    DISTRICT_NUMBER
SCHOOL_NAME SCHOOL_NAME SCHOOL_NAME SCHOOL_NAME TYPE
    SCHOOL_DISTRICT_STOP_WORD DISTRICT_STOP_WORD
    DISTRICT_NUMBER

SCHOOL_NAME TYPE SCHOOL DISTRICT DISTRICT_NUMBER
    DISTRICT_NUMBER
SCHOOL_NAME SCHOOL_NAME TYPE SCHOOL DISTRICT DISTRICT_NUMBER
    DISTRICT_NUMBER
SCHOOL_NAME SCHOOL_NAME SCHOOL_NAME TYPE SCHOOL DISTRICT
    DISTRICT_NUMBER DISTRICT_NUMBER
SCHOOL_NAME SCHOOL_NAME SCHOOL_NAME SCHOOL_NAME TYPE
    SCHOOL DISTRICT DISTRICT_NUMBER DISTRICT_NUMBER
SCHOOL_NAME TYPE SCHOOL_DISTRICT_STOP_WORD DISTRICT_STOP_WORD
    DISTRICT_NUMBER DISTRICT_NUMBER
SCHOOL_NAME SCHOOL_NAME TYPE SCHOOL_DISTRICT_STOP_WORD
    DISTRICT_STOP_WORD DISTRICT_NUMBER DISTRICT_NUMBER
SCHOOL_NAME SCHOOL_NAME SCHOOL_NAME TYPE
    SCHOOL_DISTRICT_STOP_WORD DISTRICT_STOP_WORD
    DISTRICT_NUMBER DISTRICT_NUMBER
SCHOOL_NAME SCHOOL_NAME SCHOOL_NAME SCHOOL_NAME TYPE
    SCHOOL_DISTRICT_STOP_WORD DISTRICT_STOP_WORD
    DISTRICT_NUMBER DISTRICT_NUMBER

SCHOOL_NAME SCHOOL
SCHOOL_NAME SCHOOL_NAME SCHOOL
SCHOOL_NAME SCHOOL_NAME SCHOOL_NAME SCHOOL
...
```

FIG. 3D  300

```
...
SCHOOL_NAME SCHOOL_NAME SCHOOL_NAME SCHOOL_NAME SCHOOL
SCHOOL_NAME TYPE SCHOOL
SCHOOL_NAME SCHOOL_NAME TYPE SCHOOL
SCHOOL_NAME SCHOOL_NAME SCHOOL_NAME TYPE SCHOOL
SCHOOL_NAME SCHOOL_NAME SCHOOL_NAME SCHOOL_NAME TYPE SCHOOL

SCHOOL_NAME DISTRICT
SCHOOL_NAME SCHOOL_NAME DISTRICT
SCHOOL_NAME SCHOOL_NAME SCHOOL_NAME DISTRICT
SCHOOL_NAME SCHOOL_NAME SCHOOL_NAME SCHOOL_NAME DISTRICT

SCHOOL_NAME DISTRICT DISTRICT_NUMBER
SCHOOL_NAME SCHOOL_NAME DISTRICT DISTRICT_NUMBER
SCHOOL_NAME SCHOOL_NAME SCHOOL_NAME DISTRICT DISTRICT_NUMBER
SCHOOL_NAME SCHOOL_NAME SCHOOL_NAME SCHOOL_NAME DISTRICT
     DISTRICT_NUMBER

SCHOOL_NAME DISTRICT DISTRICT_NUMBER DISTRICT_NUMBER
SCHOOL_NAME SCHOOL_NAME DISTRICT DISTRICT_NUMBER
     DISTRICT_NUMBER
SCHOOL_NAME SCHOOL_NAME SCHOOL_NAME DISTRICT DISTRICT_NUMBER
     DISTRICT_NUMBER
SCHOOL_NAME SCHOOL_NAME SCHOOL_NAME SCHOOL_NAME DISTRICT
     DISTRICT_NUMBER DISTRICT_NUMBER

SCHOOL_NAME TYPE DISTRICT
SCHOOL_NAME SCHOOL_NAME TYPE DISTRICT
SCHOOL_NAME SCHOOL_NAME SCHOOL_NAME TYPE DISTRICT
SCHOOL_NAME SCHOOL_NAME SCHOOL_NAME SCHOOL_NAME TYPE
     DISTRICT
SCHOOL_NAME TYPE DISTRICT DISTRICT_NUMBER
SCHOOL_NAME SCHOOL_NAME TYPE DISTRICT DISTRICT_NUMBER
SCHOOL_NAME SCHOOL_NAME SCHOOL_NAME TYPE DISTRICT
     DISTRICT_NUMBER
SCHOOL_NAME SCHOOL_NAME SCHOOL_NAME SCHOOL_NAME TYPE
     DISTRICT DISTRICT_NUMBER

SCHOOL_NAME TYPE DISTRICT DISTRICT_NUMBER DISTRICT_NUMBER
SCHOOL_NAME SCHOOL_NAME TYPE DISTRICT DISTRICT_NUMBER
     DISTRICT_NUMBER
SCHOOL_NAME SCHOOL_NAME SCHOOL_NAME TYPE DISTRICT
     DISTRICT_NUMBER DISTRICT_NUMBER
...
```

FIG. 3E   300

```
...
SCHOOL_NAME SCHOOL_NAME SCHOOL_NAME SCHOOL_NAME  TYPE
     DISTRICT DISTRICT_NUMBER DISTRICT_NUMBER
SCHOOL_NAME  SCHOOL DISTRICT COUNTY_NAME COUNTY
SCHOOL_NAME SCHOOL_NAME  SCHOOL DISTRICT COUNTY_NAME COUNTY
SCHOOL_NAME SCHOOL_NAME SCHOOL_NAME  SCHOOL DISTRICT
     COUNTY_NAME COUNTY
SCHOOL_NAME SCHOOL_NAME SCHOOL_NAME SCHOOL_NAME  SCHOOL
     DISTRICT COUNTY_NAME COUNTY

SCHOOL_NAME  SCHOOL DISTRICT OF COUNTY_NAME COUNTY
SCHOOL_NAME SCHOOL_NAME  SCHOOL DISTRICT OF  COUNTY_NAME
     COUNTY
SCHOOL_NAME SCHOOL_NAME SCHOOL_NAME  SCHOOL DISTRICT OF
     COUNTY_NAME COUNTY
SCHOOL_NAME SCHOOL_NAME SCHOOL_NAME SCHOOL_NAME  SCHOOL
     DISTRICT OF  COUNTY_NAME COUNTY

SCHOOL_NAME  SCHOOL DISTRICT OF COUNTY_NAME
SCHOOL_NAME SCHOOL_NAME  SCHOOL DISTRICT OF  COUNTY_NAME
SCHOOL_NAME SCHOOL_NAME SCHOOL_NAME  SCHOOL DISTRICT OF
     COUNTY_NAME
SCHOOL_NAME SCHOOL_NAME SCHOOL_NAME SCHOOL_NAME  SCHOOL
     DISTRICT OF  COUNTY_NAME

SCHOOL_NAME  SCHOOL DISTRICT DISTRICT_NUMBER COUNTY_NAME
     COUNTY
SCHOOL_NAME SCHOOL_NAME  SCHOOL DISTRICT DISTRICT_NUMBER
     COUNTY_NAME COUNTY
SCHOOL_NAME SCHOOL_NAME SCHOOL_NAME  SCHOOL DISTRICT
     DISTRICT_NUMBER COUNTY_NAME COUNTY
SCHOOL_NAME SCHOOL_NAME SCHOOL_NAME SCHOOL_NAME  SCHOOL
     DISTRICT DISTRICT_NUMBER COUNTY_NAME COUNTY

SCHOOL_NAME  SCHOOL DISTRICT DISTRICT_NUMBER DISTRICT_NUMBER
     COUNTY_NAME COUNTY
 SCHOOL_NAME SCHOOL_NAME  SCHOOL DISTRICT DISTRICT_NUMBER
     DISTRICT_NUMBER COUNTY_NAME COUNTY
SCHOOL_NAME SCHOOL_NAME SCHOOL_NAME  SCHOOL DISTRICT
     DISTRICT_NUMBER DISTRICT_NUMBER COUNTY_NAME COUNTY
SCHOOL_NAME SCHOOL_NAME SCHOOL_NAME SCHOOL_NAME  SCHOOL
     DISTRICT DISTRICT_NUMBER DISTRICT_NUMBER COUNTY_NAME
     COUNTY
...
```

FIG. 3G

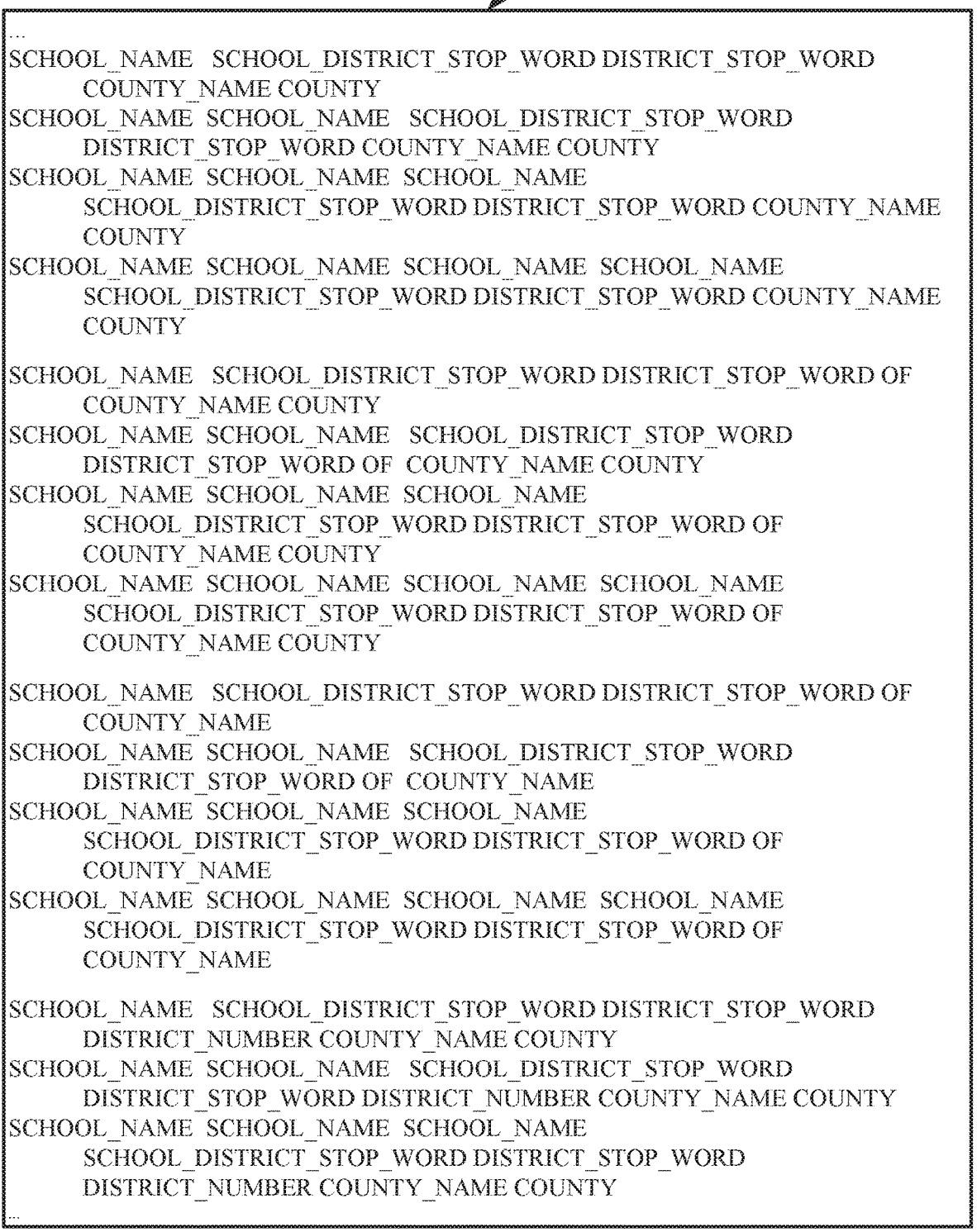

300

...
SCHOOL_NAME  SCHOOL_DISTRICT_STOP_WORD DISTRICT_STOP_WORD COUNTY_NAME COUNTY
SCHOOL_NAME SCHOOL_NAME  SCHOOL_DISTRICT_STOP_WORD DISTRICT_STOP_WORD COUNTY_NAME COUNTY
SCHOOL_NAME SCHOOL_NAME SCHOOL_NAME  SCHOOL_DISTRICT_STOP_WORD DISTRICT_STOP_WORD COUNTY_NAME COUNTY
SCHOOL_NAME SCHOOL_NAME SCHOOL_NAME SCHOOL_NAME  SCHOOL_DISTRICT_STOP_WORD DISTRICT_STOP_WORD COUNTY_NAME COUNTY

SCHOOL_NAME  SCHOOL_DISTRICT_STOP_WORD DISTRICT_STOP_WORD OF COUNTY_NAME COUNTY
SCHOOL_NAME SCHOOL_NAME  SCHOOL_DISTRICT_STOP_WORD DISTRICT_STOP_WORD OF  COUNTY_NAME COUNTY
SCHOOL_NAME SCHOOL_NAME SCHOOL_NAME  SCHOOL_DISTRICT_STOP_WORD DISTRICT_STOP_WORD OF COUNTY_NAME COUNTY
SCHOOL_NAME SCHOOL_NAME SCHOOL_NAME SCHOOL_NAME  SCHOOL_DISTRICT_STOP_WORD DISTRICT_STOP_WORD OF COUNTY_NAME COUNTY

SCHOOL_NAME  SCHOOL_DISTRICT_STOP_WORD DISTRICT_STOP_WORD OF COUNTY_NAME
SCHOOL_NAME SCHOOL_NAME  SCHOOL_DISTRICT_STOP_WORD DISTRICT_STOP_WORD OF  COUNTY_NAME
SCHOOL_NAME SCHOOL_NAME SCHOOL_NAME  SCHOOL_DISTRICT_STOP_WORD DISTRICT_STOP_WORD OF COUNTY_NAME
SCHOOL_NAME SCHOOL_NAME SCHOOL_NAME SCHOOL_NAME  SCHOOL_DISTRICT_STOP_WORD DISTRICT_STOP_WORD OF COUNTY_NAME

SCHOOL_NAME  SCHOOL_DISTRICT_STOP_WORD DISTRICT_STOP_WORD DISTRICT_NUMBER COUNTY_NAME COUNTY
SCHOOL_NAME SCHOOL_NAME  SCHOOL_DISTRICT_STOP_WORD DISTRICT_STOP_WORD DISTRICT_NUMBER COUNTY_NAME COUNTY
SCHOOL_NAME SCHOOL_NAME SCHOOL_NAME  SCHOOL_DISTRICT_STOP_WORD DISTRICT_STOP_WORD DISTRICT_NUMBER COUNTY_NAME COUNTY
...

```
...
SCHOOL_NAME SCHOOL_NAME SCHOOL_NAME SCHOOL_NAME
      SCHOOL_DISTRICT_STOP_WORD DISTRICT_STOP_WORD
      DISTRICT_NUMBER COUNTY_NAME COUNTY
SCHOOL_NAME  SCHOOL_DISTRICT_STOP_WORD DISTRICT_STOP_WORD
      DISTRICT_NUMBER DISTRICT_NUMBER COUNTY_NAME COUNTY
SCHOOL_NAME SCHOOL_NAME  SCHOOL_DISTRICT_STOP_WORD
      DISTRICT_STOP_WORD DISTRICT_NUMBER DISTRICT_NUMBER
      COUNTY_NAME COUNTY
SCHOOL_NAME SCHOOL_NAME SCHOOL_NAME
      SCHOOL_DISTRICT_STOP_WORD DISTRICT_STOP_WORD
      DISTRICT_NUMBER DISTRICT_NUMBER COUNTY_NAME COUNTY
SCHOOL_NAME SCHOOL_NAME SCHOOL_NAME SCHOOL_NAME
      SCHOOL_DISTRICT_STOP_WORD DISTRICT_STOP_WORD
      DISTRICT_NUMBER DISTRICT_NUMBER COUNTY_NAME COUNTY

SCHOOL_NAME  TYPE SCHOOL_DISTRICT_STOP_WORD DISTRICT_STOP_WORD
      COUNTY_NAME COUNTY
SCHOOL_NAME SCHOOL_NAME  TYPE SCHOOL_DISTRICT_STOP_WORD
      DISTRICT_STOP_WORD COUNTY_NAME COUNTY
SCHOOL_NAME SCHOOL_NAME SCHOOL_NAME  TYPE
      SCHOOL_DISTRICT_STOP_WORD DISTRICT_STOP_WORD COUNTY_NAME
      COUNTY
SCHOOL_NAME SCHOOL_NAME SCHOOL_NAME SCHOOL_NAME  TYPE
      SCHOOL_DISTRICT_STOP_WORD DISTRICT_STOP_WORD COUNTY_NAME
      COUNTY

SCHOOL_NAME  TYPE SCHOOL_DISTRICT_STOP_WORD DISTRICT_STOP_WORD
      OF COUNTY_NAME COUNTY
SCHOOL_NAME SCHOOL_NAME  TYPE SCHOOL_DISTRICT_STOP_WORD
      DISTRICT_STOP_WORD OF  COUNTY_NAME COUNTY
SCHOOL_NAME SCHOOL_NAME SCHOOL_NAME  TYPE
      SCHOOL_DISTRICT_STOP_WORD DISTRICT_STOP_WORD OF
      COUNTY_NAME COUNTY
SCHOOL_NAME SCHOOL_NAME SCHOOL_NAME SCHOOL_NAME  TYPE
      SCHOOL_DISTRICT_STOP_WORD DISTRICT_STOP_WORD OF
      COUNTY_NAME COUNTY

SCHOOL_NAME  TYPE SCHOOL_DISTRICT_STOP_WORD DISTRICT_STOP_WORD
      OF COUNTY_NAME
SCHOOL_NAME SCHOOL_NAME  TYPE SCHOOL_DISTRICT_STOP_WORD
      DISTRICT_STOP_WORD OF  COUNTY_NAME
```

```
...
SCHOOL_NAME SCHOOL_NAME SCHOOL_NAME  TYPE
     SCHOOL_DISTRICT_STOP_WORD DISTRICT_STOP_WORD OF
     COUNTY_NAME
SCHOOL_NAME SCHOOL_NAME SCHOOL_NAME SCHOOL_NAME  TYPE
     SCHOOL_DISTRICT_STOP_WORD DISTRICT_STOP_WORD OF
     COUNTY_NAME
SCHOOL_NAME  TYPE SCHOOL_DISTRICT_STOP_WORD DISTRICT_STOP_WORD
     DISTRICT_NUMBER COUNTY_NAME COUNTY
SCHOOL_NAME SCHOOL_NAME  TYPE SCHOOL_DISTRICT_STOP_WORD
     DISTRICT_STOP_WORD DISTRICT_NUMBER COUNTY_NAME COUNTY
SCHOOL_NAME SCHOOL_NAME SCHOOL_NAME  TYPE
     SCHOOL_DISTRICT_STOP_WORD DISTRICT_STOP_WORD
     DISTRICT_NUMBER COUNTY_NAME COUNTY
SCHOOL_NAME SCHOOL_NAME SCHOOL_NAME SCHOOL_NAME  TYPE
     SCHOOL_DISTRICT_STOP_WORD DISTRICT_STOP_WORD
     DISTRICT_NUMBER COUNTY_NAME COUNTY

SCHOOL_NAME  TYPE SCHOOL_DISTRICT_STOP_WORD DISTRICT_STOP_WORD
     DISTRICT_NUMBER DISTRICT_NUMBER COUNTY_NAME COUNTY
SCHOOL_NAME SCHOOL_NAME  TYPE SCHOOL_DISTRICT_STOP_WORD
     DISTRICT_STOP_WORD DISTRICT_NUMBER DISTRICT_NUMBER
     COUNTY_NAME COUNTY
SCHOOL_NAME SCHOOL_NAME SCHOOL_NAME  TYPE
     SCHOOL_DISTRICT_STOP_WORD DISTRICT_STOP_WORD
     DISTRICT_NUMBER DISTRICT_NUMBER COUNTY_NAME COUNTY
SCHOOL_NAME SCHOOL_NAME SCHOOL_NAME SCHOOL_NAME  TYPE
     SCHOOL_DISTRICT_STOP_WORD DISTRICT_STOP_WORD
     DISTRICT_NUMBER DISTRICT_NUMBER COUNTY_NAME COUNTY

SCHOOL_NAME  SCHOOL COUNTY_NAME COUNTY
SCHOOL_NAME SCHOOL_NAME  SCHOOL COUNTY_NAME COUNTY
SCHOOL_NAME SCHOOL_NAME SCHOOL_NAME  SCHOOL COUNTY_NAME
     COUNTY
SCHOOL_NAME SCHOOL_NAME SCHOOL_NAME SCHOOL_NAME  SCHOOL
     COUNTY_NAME COUNTY

SCHOOL_NAME  SCHOOL OF COUNTY_NAME COUNTY
SCHOOL_NAME SCHOOL_NAME  SCHOOL OF COUNTY_NAME COUNTY
SCHOOL_NAME SCHOOL_NAME SCHOOL_NAME  SCHOOL OF COUNTY_NAME
     COUNTY
SCHOOL_NAME SCHOOL_NAME SCHOOL_NAME SCHOOL_NAME  SCHOOL OF
     COUNTY_NAME COUNTY
...
```

```
...
SCHOOL_NAME  SCHOOL OF COUNTY_NAME
SCHOOL_NAME  SCHOOL_NAME  SCHOOL OF  COUNTY_NAME
SCHOOL_NAME  SCHOOL_NAME  SCHOOL_NAME  SCHOOL OF  COUNTY_NAME
SCHOOL_NAME  SCHOOL_NAME  SCHOOL_NAME  SCHOOL_NAME  SCHOOL OF
     COUNTY_NAME
SCHOOL_NAME  TYPE SCHOOL COUNTY_NAME COUNTY
SCHOOL_NAME  SCHOOL_NAME  TYPE SCHOOL COUNTY_NAME COUNTY
SCHOOL_NAME  SCHOOL_NAME  SCHOOL_NAME  TYPE SCHOOL
     COUNTY_NAME COUNTY
SCHOOL_NAME  SCHOOL_NAME  SCHOOL_NAME  SCHOOL_NAME  TYPE SCHOOL
     COUNTY_NAME COUNTY

SCHOOL_NAME  TYPE SCHOOL OF COUNTY_NAME COUNTY
SCHOOL_NAME  SCHOOL_NAME  TYPE SCHOOL OF  COUNTY_NAME COUNTY
SCHOOL_NAME  SCHOOL_NAME  SCHOOL_NAME  TYPE SCHOOL OF
     COUNTY_NAME COUNTY
SCHOOL_NAME  SCHOOL_NAME  SCHOOL_NAME  SCHOOL_NAME  TYPE SCHOOL
     OF  COUNTY_NAME COUNTY

SCHOOL_NAME  TYPE SCHOOL OF COUNTY_NAME
SCHOOL_NAME  SCHOOL_NAME  TYPE SCHOOL OF  COUNTY_NAME
SCHOOL_NAME  SCHOOL_NAME  SCHOOL_NAME  TYPE SCHOOL OF
     COUNTY_NAME
SCHOOL_NAME  SCHOOL_NAME  SCHOOL_NAME  SCHOOL_NAME  TYPE SCHOOL
     OF  COUNTY_NAME

SCHOOL_NAME  DISTRICT COUNTY_NAME COUNTY
SCHOOL_NAME  SCHOOL_NAME  DISTRICT COUNTY_NAME COUNTY
SCHOOL_NAME  SCHOOL_NAME  SCHOOL_NAME  DISTRICT COUNTY_NAME
     COUNTY
SCHOOL_NAME  SCHOOL_NAME  SCHOOL_NAME  SCHOOL_NAME  DISTRICT
     COUNTY_NAME COUNTY

SCHOOL_NAME  DISTRICT OF COUNTY_NAME COUNTY
SCHOOL_NAME  SCHOOL_NAME  DISTRICT OF  COUNTY_NAME COUNTY
SCHOOL_NAME  SCHOOL_NAME  SCHOOL_NAME  DISTRICT OF  COUNTY_NAME
     COUNTY
SCHOOL_NAME  SCHOOL_NAME  SCHOOL_NAME  SCHOOL_NAME  DISTRICT OF
     COUNTY_NAME COUNTY

SCHOOL_NAME  DISTRICT OF COUNTY_NAME
SCHOOL_NAME  SCHOOL_NAME  DISTRICT OF  COUNTY_NAME
...
```

```
...
SCHOOL_NAME SCHOOL_NAME SCHOOL_NAME  DISTRICT OF  COUNTY_NAME
SCHOOL_NAME SCHOOL_NAME SCHOOL_NAME SCHOOL_NAME  DISTRICT OF
      COUNTY_NAME
SCHOOL_NAME  DISTRICT DISTRICT_NUMBER COUNTY_NAME COUNTY
SCHOOL_NAME SCHOOL_NAME  DISTRICT DISTRICT_NUMBER COUNTY_NAME
      COUNTY
SCHOOL_NAME SCHOOL_NAME SCHOOL_NAME  DISTRICT DISTRICT_NUMBER
      COUNTY_NAME COUNTY
SCHOOL_NAME SCHOOL_NAME SCHOOL_NAME SCHOOL_NAME  DISTRICT
      DISTRICT_NUMBER COUNTY_NAME COUNTY

SCHOOL_NAME  DISTRICT DISTRICT_NUMBER DISTRICT_NUMBER
      COUNTY_NAME COUNTY
SCHOOL_NAME SCHOOL_NAME  DISTRICT DISTRICT_NUMBER
      DISTRICT_NUMBER COUNTY_NAME COUNTY
SCHOOL_NAME SCHOOL_NAME SCHOOL_NAME  DISTRICT DISTRICT_NUMBER
      DISTRICT_NUMBER COUNTY_NAME COUNTY
SCHOOL_NAME SCHOOL_NAME SCHOOL_NAME SCHOOL_NAME  DISTRICT
      DISTRICT_NUMBER DISTRICT_NUMBER COUNTY_NAME COUNTY

SCHOOL_NAME   TYPE DISTRICT COUNTY_NAME COUNTY
SCHOOL_NAME SCHOOL_NAME   TYPE DISTRICT COUNTY_NAME COUNTY
SCHOOL_NAME SCHOOL_NAME SCHOOL_NAME   TYPE DISTRICT
      COUNTY_NAME COUNTY
SCHOOL_NAME SCHOOL_NAME SCHOOL_NAME SCHOOL_NAME   TYPE
      DISTRICT COUNTY_NAME COUNTY

SCHOOL_NAME   TYPE DISTRICT OF COUNTY_NAME COUNTY
SCHOOL_NAME SCHOOL_NAME   TYPE DISTRICT OF  COUNTY_NAME COUNTY
SCHOOL_NAME SCHOOL_NAME SCHOOL_NAME   TYPE DISTRICT OF
      COUNTY_NAME COUNTY
SCHOOL_NAME SCHOOL_NAME SCHOOL_NAME SCHOOL_NAME   TYPE
      DISTRICT OF  COUNTY_NAME COUNTY

SCHOOL_NAME   TYPE DISTRICT OF COUNTY_NAME
SCHOOL_NAME SCHOOL_NAME   TYPE DISTRICT OF  COUNTY_NAME
SCHOOL_NAME SCHOOL_NAME SCHOOL_NAME   TYPE DISTRICT OF
      COUNTY_NAME
SCHOOL_NAME SCHOOL_NAME SCHOOL_NAME SCHOOL_NAME   TYPE
      DISTRICT OF  COUNTY_NAME
SCHOOL_NAME   TYPE DISTRICT DISTRICT_NUMBER COUNTY_NAME COUNTY
...
```

FIG. 3L 300

```
...
SCHOOL_NAME SCHOOL_NAME   TYPE DISTRICT DISTRICT_NUMBER
COUNTY_NAME COUNTY
SCHOOL_NAME SCHOOL_NAME SCHOOL_NAME   TYPE DISTRICT
DISTRICT_NUMBER COUNTY_NAME COUNTY
SCHOOL_NAME SCHOOL_NAME SCHOOL_NAME SCHOOL_NAME   TYPE
DISTRICT DISTRICT_NUMBER COUNTY_NAME COUNTY
SCHOOL_NAME   TYPE DISTRICT DISTRICT_NUMBER
DISTRICT_NUMBERCOUNTY_NAME COUNTY
SCHOOL_NAME SCHOOL_NAME   TYPE DISTRICT DISTRICT_NUMBER
DISTRICT_NUMBER COUNTY_NAME COUNTY
SCHOOL_NAME SCHOOL_NAME SCHOOL_NAME   TYPE DISTRICT
DISTRICT_NUMBER DISTRICT_NUMBER COUNTY_NAME COUNTY
SCHOOL_NAME SCHOOL_NAME SCHOOL_NAME SCHOOL_NAME   TYPE
DISTRICT DISTRICT_NUMBER DISTRICT_NUMBER COUNTY_NAME COUNTY

SCHOOL_NAME   TYPE
SCHOOL_NAME SCHOOL_NAME   TYPE
SCHOOL_NAME SCHOOL_NAME SCHOOL_NAME   TYPE
SCHOOL_NAME SCHOOL_NAME SCHOOL_NAME SCHOOL_NAME   TYPE

SCHOOL_NAME SCHOOL  TYPE
SCHOOL_NAME SCHOOL_NAME SCHOOL  TYPE
SCHOOL_NAME SCHOOL_NAME SCHOOL_NAME SCHOOL  TYPE
SCHOOL_NAME SCHOOL_NAME SCHOOL_NAME SCHOOL_NAME SCHOOL  TYPE

SCHOOL_NAME SCHOOL  TYPE SCHOOL
SCHOOL_NAME SCHOOL_NAME SCHOOL  TYPE SCHOOL
SCHOOL_NAME SCHOOL_NAME SCHOOL_NAME SCHOOL  TYPE SCHOOL
SCHOOL_NAME SCHOOL_NAME SCHOOL_NAME SCHOOL_NAME SCHOOL  TYPE
SCHOOL

SCHOOL_NAME SCHOOL  COUNTY_NAME
SCHOOL_NAME SCHOOL_NAME SCHOOL  COUNTY_NAME
SCHOOL_NAME SCHOOL_NAME SCHOOL_NAME SCHOOL  COUNTY_NAME
SCHOOL_NAME SCHOOL_NAME SCHOOL_NAME SCHOOL_NAME SCHOOL
COUNTY_NAME

SCHOOL_NAME SCHOOL  COUNTY_NAME COUNTY
SCHOOL_NAME SCHOOL_NAME SCHOOL  COUNTY_NAME COUNTY
SCHOOL_NAME SCHOOL_NAME SCHOOL_NAME SCHOOL  COUNTY_NAME
COUNTY
SCHOOL_NAME SCHOOL_NAME SCHOOL_NAME SCHOOL_NAME SCHOOL
COUNTY_NAME COUNTY
```

```
..
                <dataProviderArg>com/salesforce/ddc/dc_datajourney/entity_parser/school_name/
district_stop_word.txt</dataProviderArg>
            </dataProviderArgs>
        </dataProvider>
    </entity>
    <entity>
        <entityName>SCHOOL_DISTRICT_STOP_WORD</entityName>
        <mapTo>school</mapTo>
        <dataProvider>
            <dataProviderName>FileValueStore</dataProviderName>
            <dataProviderArgs>
                <dataProviderArg>com/salesforce/ddc/dc_datajourney/entity_parser/school_name/
school_district_stop_word.txt</dataProviderArg>
            </dataProviderArgs>
        </dataProvider>
    </entity>
    <entity>
        <entityName>TYPE</entityName>
        <mapTo>school_type</mapTo>
        <dataProvider>
            <dataProviderName>FileValueStore</dataProviderName>
            <dataProviderArgs>
                <dataProviderArg>com/salesforce/ddc/dc_datajourney/entity_parser/school_name/
type.txt</dataProviderArg>
            </dataProviderArgs>
        </dataProvider>
    </entity>
    <entity>
        <entityName>SCHOOL_NAME</entityName>
        <regExNames>
            <regExName>alpha_word</regExName>
        </regExNames>
        <!--Likelihood heuristically determined. Average length of word = 4, Probability of a
word = 1/26^4 = 0.00000218829-->
        <likelihood>0.00000218829</likelihood>
    </entity>
    <entity>
..
```

```
    <entityName>COUNTY_NAME</entityName>
    <regExNames>
       <regExName>alpha_word</regExName>
    </regExNames>
    <!--Likelihood heuristically determined. Average length of word = 4, Probability of a word = 1/26^4 = 0.00000218829-->
    <likelihood>0.00000218829</likelihood>
  </entity>
  <entity>
    <entityName>DISTRICT_NUMBER</entityName>
    <regExNames>
       <regExName>district_number</regExName>
    </regExNames>
    <!--Likelihood heuristically determined. Average length of word = 2, Probability of a word = 1/10^2 = 0.01-->
    <likelihood>0.01</likelihood>
  </entity>
</entities>

<regExDefinitions>
  <regExDefinition>
    <regExName>alpha_word</regExName>
    <regExPattern><![CDATA[^[a-z-']{1,}$]]></regExPattern>
  </regExDefinition>
  <regExDefinition>
    <regExName>district_number</regExName>
    <regExPattern><![CDATA[^#?[a-z]{0,2}[0-9-]{1,}$]]></regExPattern>
  </regExDefinition>
</regExDefinitions>
</entityParser>
```

```
...
LAST_NAME, FIRST_NAME m d
LAST_NAME, FIRST_NAME MIDDLE_NAME psy d
FIRST_NAME LAST_NAME , o d
dr FIRST_NAME LAST_NAME psy d
LAST_NAME m d
LAST_NAME, FIRST_NAME , m d
LAST_NAME, FIRST_NAME , DESIGNATION →DESIGNATION
LAST_NAME DESIGNATION
dr FIRST_NAME LAST_NAME SUFFIX
FIRST_NAME LAST_NAME , DESIGNATION DESIGNATION
dr LAST_NAME , FIRST_NAME o d
dr FIRST_NAME LAST_NAME SUFFIX , m d
LAST_NAME , FIRST_NAME MIDDLE_NAME , DESIGNATION , DESIGNATION
dr FIRST_NAME MIDDLE_NAME LAST_NAME SUFFIX , DESIGNATION DESIGNATION
dr FIRST_NAME MIDDLE_NAME LAST_NAME SUFFIX , DESIGNATION
dr FIRST_NAME LAST_NAME SUFFIX , → DESIGNATION
dr LAST_NAME , FIRST_NAME DESIGNATION , DESIGNATION
dr FIRST_NAME MIDDLE_NAME LAST_NAME
dr LAST_NAME , FIRST_NAME
dr LAST_NAME , FIRST_NAME , m → d
FIRST_NAME MIDDLE_NAME LAST_NAME o d
dr FIRST_NAME MIDDLE_NAME LAST_NAME SUFFIX , o d
dr FIRST_NAME LAST_NAME DESIGNATION
dr LAST_NAME , FIRST_NAME MIDDLE_NAME , o d
dr FIRST_NAME LAST_NAME SUFFIX o → d
FIRST_NAME MIDDLE_NAME LAST_NAME SUFFIX o d
dr LAST_NAME , FIRST_NAME MIDDLE_NAME → DESIGNATION
FIRST_NAME LAST_NAME SUFFIX , o d
FIRST_NAME MIDDLE_NAME LAST_NAME DESIGNATION → DESIGNATION
FIRST_NAME LAST_NAME SUFFIX , DESIGNATION → DESIGNATION
dr FIRST_NAME MIDDLE_NAME LAST_NAME , DESIGNATION , DESIGNATION
...
```

```
...
FIRST_NAME LAST_NAME DESIGNATION DESIGNATION
FIRST_NAME MIDDLE_NAME LAST_NAME SUFFIX , o d
dr FIRST_NAME LAST_NAME m d
dr FIRST_NAME LAST_NAME SUFFIX DESIGNATION , DESIGNATION
LAST_NAME , FIRST_NAME MIDDLE_NAME
dr FIRST_NAME LAST_NAME SUFFIX psy → d
dr LAST_NAME , FIRST_NAME MIDDLE_NAME , psy d
LAST_NAME , FIRST_NAME , DESIGNATION
dr LAST_NAME , FIRST_NAME MIDDLE_NAME psy d
dr LAST_NAME , FIRST_NAME , o →d
dr FIRST_NAME MIDDLE_NAME LAST_NAME DESIGNATION , DESIGNATION
dr FIRST_NAME LAST_NAME DESIGNATION , DESIGNATION
LAST_NAME , FIRST_NAME MIDDLE_NAME DESIGNATION DESIGNATION
LAST_NAME , FIRST_NAME DESIGNATION → DESIGNATION
dr FIRST_NAME MIDDLE_NAME LAST_NAME o d
FIRST_NAME MIDDLE_NAME LAST_NAME SUFFIX psy d
FIRST_NAME LAST_NAME SUFFIX m d
LAST_NAME , FIRST_NAME
FIRST_NAME MIDDLE_NAME LAST_NAME , o →d
FIRST_NAME MIDDLE_NAME LAST_NAME psy d
FIRST_NAME LAST_NAME SUFFIX , psy d
dr FIRST_NAME LAST_NAME , m d
dr FIRST_NAME MIDDLE_NAME LAST_NAME → SUFFIX
FIRST_NAME MIDDLE_NAME LAST_NAME SUFFIX , DESIGNATION , DESIGNATION
dr FIRST_NAME MIDDLE_NAME LAST_NAME , psy d
dr FIRST_NAME LAST_NAME , DESIGNATION →DESIGNATION
dr FIRST_NAME MIDDLE_NAME LAST_NAME , DESIGNATION
FIRST_NAME MIDDLE_NAME LAST_NAME , DESIGNATION DESIGNATION
dr FIRST_NAME LAST_NAME SUFFIX , DESIGNATION , DESIGNATION
...
```

```xml
<?xml version="1.0" encoding="UTF-8"?>
<entityParser version="2.0">
  <tokenSeparatorsRegEx><![CDATA[[\s]+]]></tokenSeparatorsRegEx>
  <preCleanRegEx><![CDATA[\.]]></preCleanRegEx>
  <flankByWhitespaceRegEx><![CDATA[([,])]]></flankByWhitespaceRegEx>

<patternsSource>com/salesforce/ddc/dc_datajourney/entity_parser/physician_name/patterns.tsv</patternsSource>

<entities>
    <entity>
      <entityName>designation</entityName>
      <dataProvider>
        <dataProviderName>FileValueStore</dataProviderName>
        <dataProviderArgs>
          <dataProviderArg>com/salesforce/ddc/dc_datajourney/entity_parser/physician_name/designations.txt</dataProviderArg>
        </dataProviderArgs>
      </dataProvider>
    </entity>
    <entity>
      <entityName>suffix</entityName>
      <dataProvider>
        <dataProviderName>FileValueStore</dataProviderName>
        <dataProviderArgs>
          <dataProviderArg>com/salesforce/ddc/dc_datajourney/entity_parser/physician_name/suffix.txt</dataProviderArg>
        </dataProviderArgs>
      </dataProvider>
    </entity>
    <entity>
      <entityName>first_name</entityName>
    </entity>
    <entity>
      <entityName>middle_name</entityName>
    </entity>
    <entity>
      <entityName>last_name</entityName>
    </entity>
    <entity>
...
```

```
...
    <entityName>FIRST_NAME_WORD</entityName>
    <mapTo>first_name</mapTo>
    <parentEntity>first_name</parentEntity>
    <regExNames>
        <regExName>alpha_word</regExName>
    </regExNames>
    <!--Likelihood heuristically determined. Average length of word = 4, Probability of a word = 1/26^4 = 0.00000218829-->
    <likelihood>0.00000218829</likelihood>
</entity>
<entity>
    <entityName>MIDDLE_NAME_WORD</entityName>
    <mapTo>middle_name</mapTo>
    <parentEntity>middle_name</parentEntity>
    <regExNames>
        <regExName>alpha_word</regExName>
    </regExNames>
    <!--Likelihood heuristically determined. Average length of word = 4, Probability of a word = 1/26^4 = 0.00000218829-->
    <likelihood>0.00000218829</likelihood>
</entity>
<entity>
    <entityName>LAST_NAME_WORD</entityName>
    <mapTo>last_name</mapTo>
    <parentEntity>last_name</parentEntity>
    <regExNames>
        <regExName>alpha_word</regExName>
    </regExNames>
    <!--Likelihood heuristically determined. Average length of word = 4, Probability of a word = 1/26^4 = 0.00000218829-->
    <likelihood>0.00000218829</likelihood>
</entity>
...
```

```xml
...
    <entity>
        <entityName>FIRST_NAME_INITIAL</entityName>
        <mapTo>first_name</mapTo>
        <parentEntity>first_name</parentEntity>
        <regExNames>
            <regExName>alpha_char</regExName>
        </regExNames>
        <!--Likelihood heuristically determined. Probability of a character = 1/26 = 0.03846153846-->
        <likelihood>0.03846153846</likelihood>
    </entity>
    <entity>
        <entityName>MIDDLE_NAME_INITIAL</entityName>
        <mapTo>middle_name</mapTo>
        <parentEntity>middle_name</parentEntity>
        <regExNames>
            <regExName>alpha_char</regExName>
        </regExNames>
        <!--Likelihood heuristically determined. Probability of a character = 1/26 = 0.03846153846-->
        <likelihood>0.03846153846</likelihood>
    </entity>
</entities>

<regExDefinitions>
    <regExDefinition>
        <regExName>alpha_char</regExName>
        <regExPattern><![CDATA[^[a-z]$]]></regExPattern>
    </regExDefinition>
    <regExDefinition>
        <regExName>alpha_word</regExName>
        <regExPattern><![CDATA[^[a-z-']{2,}$]]></regExPattern>
    </regExDefinition>
</regExDefinitions>
</entityParser>
```

ADAPTIVE RECOGNITION OF ENTITIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database can store digital objects or records for each person or organization that may be able to help in achieving a goal. Each record can consist of a few standard fields, such as organization name, street address, city, state, zip code, country, website address, e-mail address, phone number, fortune 500 ranking, number of employees, and annual revenue. A data platform enables data providers, such as data marketplace vendors and crowd-sourced database system users, to provide their datasets to organizations via the platform. After an organization inputs a dataset from the platform, the organization's database system matches the input dataset's records, which may be referred to as suspect records or prospective records, to appropriate type(s) of the organization's existing records, which may be referred to as candidate records. A database system can identify which existing database records sufficiently match the input record. The matching results may be sorted or ranked based on their closeness to input record. The database system can use suitable fields of data from the matching input records to update the organization's existing records or add to the organization's matching existing records, thereby enriching the organization's existing records. For example, a database system inputs a record that includes (Company name: Salesforce|Street Address: 1 Market St.|City: San Francisco|State: CA|Employee count: 19,100), and determines that the existing record which is the most closely related to this input record is the database record that includes (COMPANY_NAME: "Salesforce.com, Inc."|ADDRESS_LINE1: "1 Market Ste 300"|CITY: "San Francisco"|STATE: "California"|ZIP: "94105-5188"|COUNTRY: "United States"|COMPANY PHONE: "+1.415.901.7000"|FORTUNE RANK: "483"|EMPLOYEE COUNT: "19,000"|REVENUE: "6,667,216,000"). Thus, in this example the matching of these records enables the database system to update the information that the database has about the company Salesforce.

After inputting a dataset's records, a database system identifies each record's fields and the strings stored by each record's fields, such as a record's street address field that stores a string and the record's person name field that stores another string. Using the field that is identified with a string, the database system specifies the type of parse to request from the database system's parser, such as requesting a parser to perform a street address parse on a string from a street address field and a person name parse on a string from person nae field. The database system passes the string and a parameter that specifies the type of parse to the parser.

Parsing is the process of separating a string into words, phrases, symbols, characters, or other meaningful elements, which may be referred to as tokens, and recognizing the tokens as specific logical semantic components, which may be referred to as entities. For example, a database system's parser parses the person name string "Dr. Robert A Schumaker Jr." into tokens that are recognized as the following corresponding person name entities: Dr.→Designation, Robert→First Name, A→Middle Name, Schumaker→Last Name. and Jr.→Suffix. A database system can use parsing to compare the similarity of two strings, such as comparing the person name strings "Dr. Robert A Schumaker Jr." and "Robert Shumaker." Even though these person name strings may represent the same person, using regular string comparison algorithms like Edit Distance or Jaro-Winkler distance to directly match these two strings will yield low scores for such a match. Therefore, a database system can use parsing to recognize important entities in a string and assign weights to recognized entities and weigh important entities more heavily than less relevant entities. For example, in a person name string, the designation (Dr.), middle name (A) and suffix (Jr.) are less important than the first name (Robert) and the last name (Schumaker).

If a database system uses a matcher such as Edit Distance to match strings, the system will miss good matches if a stringent matching threshold is applied, and will generate many false matches if the matching threshold that is applied is sufficiently low to pick up these missing good matches. What is important for matching is not how much strings match, rather which entities in the strings match. Furthermore, once a database system has recognized different entities in a parsed string, the database system can use different algorithms and thresholds to match these entities. For example, a database system can use the following match rules to match person name entities:

First Name
  Missing Data
    No Match
  Algorithm
    Edit Distance
    Threshold: 80
  OR
  Algorithm
    Soundex
    Threshold: 99
Middle Name
  Missing Data
    Match
  Algorithm
    Edit Distance
    Threshold: 85
  OR
  Algorithm
    Initials
    Threshold: 100
Last Name
  Missing Data
    No Match
  Algorithm
    Edit Distance
    Threshold: 85

When using these match rules, person name strings match when all three of the recognized entities match, with the middle name match using either initials or a stricter threshold of edit distance. For example, the string "Robert A Shumaker" matches the string "Robert Alakay Shumaker." In case of missing data for a middle name, the middle name match rule should return true, such as the string "Robert A Shumaker" matches the string "Robert Shumaker." In contrast, if the first name is missing, the match rule will result in no match because the match rules listed above can match when missing only a middle name, but not when missing a first name.

There are multiple approaches for recognizing tokens in a string as specific entities. The most commonly used approaches use grammar based parsing methods like regular expressions or statistical approaches like Hidden Markov Models. Grammar-based parsing approaches are quite strict because they do not incorporate fuzziness in matching. Grammar-based parsing makes hard decisions—either strings are a match or are not a match. Consequently, to avoid rejecting approximate matches by being too strict, a grammar-based parsing requires very complex grammar to detect all approximate matches. For example, generating a regular expression to parse street addresses in different countries is a time-consuming process and the generated regular expression may still not be able to incorporate all kinds of street names, such as American, French, and Spanish street names. Since a significant amount of information is compacted in a single regular expression, designing and debugging such a regular expression may be difficult.

While statistical methods like Hidden Markov Models are able to deal with fuzziness in data, statistical methods have their own disadvantages. For example, statistical methods require a significant amount of data and parameters for training, and statistical methods may not be easily molded to parse certain types of strings once a statistical model is ready for use. Since Hidden Markov Models are based on a Markovian assumption, such a model's structure cannot be changed arbitrarily once the structure has been set. Unlike regular expressions that capture domain knowledge of arbitrary complexity, Hidden Markov Models are not as convenient for capturing domain knowledge.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 1 A-B illustrate an example XML configuration file for street address parsing that enables adaptive recognition of entities, in an embodiment;

FIGS. 8 A-C illustrate an example person name XML configuration file for adaptive recognition of entities, in an embodiment;

DETAILED DESCRIPTION

General Overview

Figure 2:
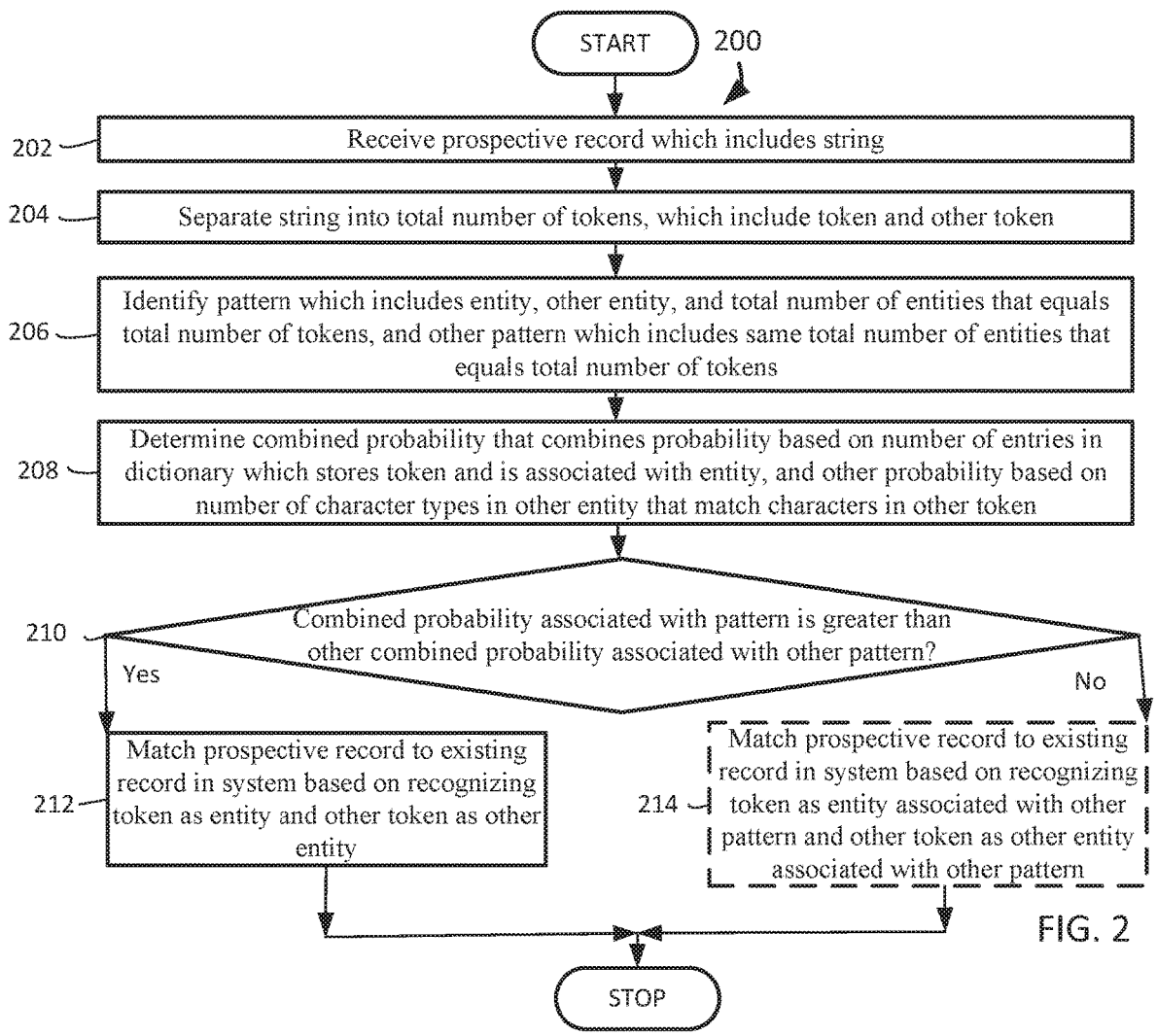
FIG. 2 is an operational flow diagram illustrating a high-level overview of a method for adaptive recognition of entities, in an embodiment.

In accordance with embodiments described herein, there are provided methods and systems for adaptive recognition of entities. A system receives a prospective record that includes a string and separates the string into a total number of tokens, including a token and another token. The system identifies a pattern that includes an entity, another entity, and a total number of entities that equals the total number of tokens, and another pattern that includes the same total number of entities that equals the total number of tokens. The system determines a combined probability that combines a probability based on a number of entries in a dictionary which stores the token and is associated with the entity, and another probability based on a number of character types in the other entity that match characters in the other token. If the combined probability associated with the pattern is greater than another combined probability associated with the other pattern, the system matches the prospective record to an existing record in the system based on recognizing the token as the entity and the other token as the other entity.

For example, an adaptive entity recognizer receives a prospective record that includes the string "1 Market St." from an input record's street address field, lowercases the letters "M" and "S," removes the special character "." and separates the string into the 3 tokens "1," "market," and "st". Since the parsed input string includes 3 tokens, the adaptive entity recognizer identifies all patterns which include 3 entities that might match the 3 tokens, including pattern 1 (street_number, street_name_word, street_name_word), pattern 2 (street_number, street_name_word, street_keyword), and pattern 3 (street_name_word, street_name_word, street_number). The adaptive entity recognizer calculates the probability of pattern 1 as {P(1|street_number)*P (market|street_name_word)*P(st|street_name_word)}* (⅓)=(¹/₁₀^4*¹/₂₆^4*¹/₂₆^4)*(⅓)=1.5962171e-16. The adaptive entity recognizer calculates the probability of pattern 2 as {P(1|street_number)*P(market|street_name_word)* P(st|street_keyword)}*(⅓)=(¹/₁₀^4*¹/₂₆^ 4*¹/₁₈)*(⅓) [There are 18 entries in street_keyword dictionary]=4.0524051e-12. The adaptive entity recognizer calculates the probability of pattern 3 as {P(1|street_name_word)* P(market|street_ name_word)*P(st|street_ number)}*(⅓)=(0*¹/₂₆^4*0)* (⅓)= 0. Since the probability of pattern 2 is the largest of the 3 patterns' probabilities, the adaptive entity recognizer recognizes the 3 tokens "1," "market," and "st" as the 3 corresponding entities (street_ number, street_name_word, street_keyword) in pattern 2. The adaptive entity recognizer parses a string into tokens that are recognized as specific entities by combining the benefits of regular expressions, which leverage domain knowledge, with the benefits of statistical methods, such as data-driven adaptation, soft decision-making. and fuzzy matching using heuristic methods.

Systems and methods are provided for adaptive recognition of entities. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and systems for adaptive recognition of entities will be described with reference to example embodiments. The following detailed description will first describe a method for adaptive recognition of entities.

While one or more implementations and techniques are described with reference to an embodiment in which adaptive recognition of entities is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

An input metadata configuration file describes what is required to set up an adaptive entity recognizer for parsing strings into tokens that are recognized as specific entities. FIGS. 1 A-B illustrate an example input data XML configuration file 100 for street address parsing that enables adaptive recognition of entities. A pattern set is a list of candidate patterns against which a parsed input string is compared. Some sample patterns for a parsed street address string may include:
highway_region highway_keyword highway_number directional_word
street_number highway_keyword highway_number
street_number highway_keyword highway_number directional_word
street_number highway_region highway_keyword highway_number
spanish_street_keyword street_name_word street_name_word
spanish_street_keyword street_name_word street_name_word
   street_name_word street_name_word spanish_connective_word
   street_name_word street_name_word spanish_connective_word
   street_name_word street_name_word The patternsSource tag in the XML configuration file specifies the file where these patterns are stored. The pattern set may be generated by identifying sub-patterns and using their cross products unions and repeats to generate larger and more elaborate set of patterns. In the following examples, each sub-pattern represents a set of entities. Sub-patterns are combined into larger patterns using cross product indicated by "*." At the end of the example sub-patterns is a depiction of a union of all the patterns generated, which is indicated by "U."

Street_name_subpattern={Street_name, (Street_name Street_name), (Street_name Street_name Street_name)}

[Indicates street_name_subpattern consists of 1 to 3 street_name words, an example of the repeat operation]

Directional_subpattern=directional_word

Street_number_subpattern=street_number

Street_suffix_subpattern=street_suffix_keyword

Street_address_pattern_noDirection_noStreetSuffix=Street_number_subpattern*Street_name_subpattern Street_address_pattern_noDirection_streetSuffix=Street_number_subpattern*Street_name_subpattern*Street_suffix_subpattern Street_address_pattern_Direction_noStreetSuffix= (Street_number_subpattern*Street_name_subpattern*Directional_subpattern) U (Street_number_subpattern*Directional_subpattern*Street_name_subpattern)

[An example of the union operation]

Street_address_pattern_Direction_StreetSuffix= (Street_number_subpattern*Street_name_subpattern*Street_suffix_subpattern*Directional_subpattern) U (Street_number_subpattern*Directional_subpattern*Street_name_subpattern*Street_suffix_subpattern)

Street_address_patterns=Street_address_pattern_noDirection_noStreetSuffix U Street_address_pattern_noDirection_streetSuffix U Street_address_pattern_Direction_noStreetSuffix U Street_address_pattern_Direction_StreetSuffix A dictionary can be a set of values that a token may take. For example, a street address parser can use the subsequent dictionaries for the following entities:
SPANISH_CONNECTIVE_WORD: de, la
SPANISH_STREET_SUFFIX: calle, avendia, aseo
STREET_SUFFIX: alley, boulevard, turnpike, drive, way
DIRECTIONAL_WORD: east, west, north, south, northeast, northwest, southeast, southwest, nw, ne, sw, se, e, w, n, s Such dictionaries may be stored in files or a database. The dataProviderName in the XML configuration file specifies how a dictionary may be retrieved. In the example above, the value of this tag is FileValueStore, which indicates that the dictionary is stored in a file.

An entity likelihood can be the probability of the input token being generated from that specific logical semantic component. The entity likelihoods may be heuristically determined. For example, an XML configuration file may define entity likelihoods for street address parsing as follows:
street_name_word→1.0/26^4, building_name_word→1.0/26^4

These entity likelihoods indicate that the probability that a given token was emitted by entity street name or entity building name is roughly ½6^4 (0.00000218829), based on the approximation that street names and building names are at least 4 characters long and each character has 26 possible values from a-z. Since the entity likelihoods are based on approximations, if a street name is actually 6 characters long, the adaptive entity recognizer still uses the probability of $1/26^4$ if the first 4 characters of a street name are letters and ignores the $5^{th}$ and $6^{th}$ characters. Similarly, for street numbers, the entity likelihood is $1/10^4$, based on the approximation that street numbers are at least 4 characters long with each character having 10 possible values from 0-9. Since the entity likelihoods are based on approximations, if a street number is actually 2 characters long, the adaptive entity recognizer still uses the probability of $1/10^4$ if the only 2 characters of a street number are digits and ignores the missing $3^{rd}$ and $4^{th}$ digits, If an input token is identified as being stored by one of the dictionaries, the entity likelihood is 1 divided by the number of entries in the dictionary. For example, the probability of the input token: "north" being a directional word is $1/16$ because the example directional word dictionary that is depicted above contains 16 entries and "north" is one of the entries. The likelihood of "xyz" being a "directional word" is 0 because "xyz" is not in the "directional word" dictionary. By contrast, the likelihood of "xyz" being a "street_name_word" is $1/26^4$. Consequently, since a dictionary captures important domain knowledge, the entity likelihood of tokens in the dictionary to their corresponding dictionary-based entities is much higher than the entity likelihood of street_name_word. For example, the input token "st" has a higher probability of being predicted as a street_keyword than a street_name_word, except when the input token's context drops the probability drastically, such as in "St. Mary Ave."

These example entity probabilities illustrate the use of domain knowledge not just for discrete patterns but also for soft (qualitative) reasoning. A heuristic probability expresses that there are a significantly large number of possible distinct street names. By contrast, there are significantly fewer different street keywords, such as ave, st, blvd, and avenue. In pure regular expression approaches, such qualitative knowledge cannot be captured. In pure statistical approaches, such as maximum likelihood, such qualitative knowledge can only be captured if the corresponding system is trained by a sufficiently large training set. In contrast, the adaptive entity recognizer captures such qualitative knowledge in the form of heuristic probabilities, thereby drastically reducing the size of the requisite training sets, and consequently generalizing better.

An entity recognizer determines how an input token is recognized as a specific entity. For example, to recognize the input token "market" from the string "1 Market St." as a "street name" entity, an entity recognizer determines whether the input token is stored in a dictionary or corresponds to some pattern matching via regular expressions. For example, in the XML configuration file above, street_keyword contains dataProvider, which indicates that if an input token is identified in the dictionary specified by dataProviderArgs, then the input token is predisposed towards being identified as a street_keyword. The entity recognizer does not make hard decisions. The entity recognizer makes only soft, likelihood-based decisions, so that the pattern-based scoring can override a soft decision with a better decision. For example, in "St Mary Ave", "St" is part of the street name and not a street_keyword even though "st" appears in the street_keyword dictionary. Similarly, a street_name_word entity may be recognized by matching any of the 3 regular expressions: alpha_word, alpha_word_hyphenated, alpha_word_underscore_alpha_word. Even in this case, the pattern matching is soft because it is likelihood-based. In the example above, the input token "st" is evaluated both as an instance of a street_name_word entity and a street_keyword entity. The street_keyword entity would match he input token "st" because the street_keyword entity's likelihood is higher than the street_name_word entity's likelihood and the context of the input token "st" does not disqualify the input token "st" from being a street_keyword entity. In this situation, the context means that the input token "st" occurs where it is expected to be found, such as when the street_keyword entity "st" is after a street_name_word entity.

In the tokenizing step, the adaptive entity recognizer receives an input string, converts any of the input string's uppercase letters to lowercase letters, and strips the lowercase input string of any special characters (as determined by the regular expression preCleanRegEx in the XML configuration file), and separates the stripped input string into tokens, as determined by the regular expression tokenSeparatorsRegEx in the XML configuration file. Then the adaptive entity recognizer identifies all patterns in the pattern set that have the same number of entities as the number of tokens in the input string. Next, the adaptive entity recognizer determines which identified patterns best matches the input tokens. This determination is done probabilistically by evaluating the probability P(Pattern|Input), which is the probability of the pattern given the input. A pattern may be denoted by E, such as E=(street_num, street_name_word, street_keyword), and the input may be denoted by I, such as I=(1, market, st). The adaptive entity recognizer scores how well E matches I. In this example, E matches I well because the input token/matches the street_num entity, the input token market matches the street_name_word entity, and the input token St matches the street_keyword entity. The adaptive entity recognizer returns the pattern Max P(E|I)
 E Using Bayes rule, $$P(E|I) \propto P(I|E)*P(E)$$

P(E) enables the weighing of some patterns more than other patterns, thereby increasing the sophistication of the adaptive entity recognizer. Furthermore, the different input tokens are assumed to be independently generated from their corresponding entities. Therefore:

$$P(E|I) \propto \{P(I_1|E_1)*P(I_2|E_2)* \ldots *P(I_N|E_N)\}*P(E)$$

The values of $P(I_j|E_j)$ are already available from the entity likelihoods stored by the XML configuration file.
$P(I_j|E_j)$=1/size of dictionary if $I_j$ is in the dictionary of entity $E_j$ OR
likelihood defined in the XML file if $I_j$ matches any of the regular expressions ELSE 0 P(E)=pattern weight.

The pattern weight may be defaulted to 1 divided by the total number of patterns that include the same number of entities, which weighs all patterns of the same length as equally likely. The adaptive entity recognizer returns the pattern with the highest P(E|I) along with the pattern's score as the output.

For example, for input I=(1, market, st), which has 3 tokens, the following patterns that each have 3 entities are potential candidates:
E1=street_number street_name_word street_name_word
E2=street_number street_name_word street_keyword
E3=street_name_word street_name_word street_number The probabilities of each pattern are computed as follows:

$$P(E1|I)=\{P(1|street\_number)*P(market|street\_name\_word)*P(st|street\_name\_word)\}*(1/3)=\\(1/10^4*1/26^4*1/26^4)*(1/3)$$

[$1/10^4$ is used for street_number's entity likelihood because/ matches street_number, $1/10^4$ is used for street_name_word's entity likelihood because market matches street_name_word, and $1/10^4$ is used for street_number's entity likelihood because st matches street_name_word]= 1.5962171e-16

$$P(E2|I)=\{P(1|street\_number)*P(market|street\_name\_word)*P(st|street\_keyword)\}*(1/3)=$$
$$(1/10^4 * 1/26^4 * 1/18)*(1/3)$$

[$1/18$ is used for street_keyword's entity likelihood because the street_keyword dictionary has 18 entries]= 4.0524051e-12

$$P(E3|I)=\{P(1|street\_name\_word)*P(market|street\_name\_word)*P(st|street\_number)\}*(1/3)=$$
$$(0*1/26^4*0)*(1/3)$$

[0 is used for street_name_word's entity likelihood because 1 does not match street_name_word, and 0 is used for street_number's entity likelihood because st does not match street_number]=0

Since P(E2|I) has the largest probability, the adaptive entity recognizer returns the pattern E2 (street_number, street_name_word, street_keyword) with the pattern's score of 4.0524051e-12.

The adaptive entity recognizer is easily adaptable, incorporates fuzziness along with domain knowledge, and is easy to use. If the adaptive entity recognizer is failing on a certain pattern, the pattern may be easily added to the set of patterns, and the adaptive entity recognizer should start parsing that pattern correctly. The adaptive entity recognizer's easy adaptability is more convenient than the modification of statistical methods, which may require adding a significant amount of training data to a training set to bias a system into parsing a string in a required way. Furthermore, since the adaptive entity recognizer outputs a score, the threshold for parsing may be easily adjusted to balance the precision (cases in which parser did not perform correctly) against the recall (cases where parser did not parse the string).

If a parse's confidence score is higher than the parse confidence threshold, the adaptive entity recognizer can use structured matching, which takes advantage of the parsing by matching on the parsed structures. The following is an example of matching the street addresses stored by address_line_1:
Street Address 1:10 Main St, Suite 220
Street Address 2: 11 Main St The parser lowercases any uppercase letters in each street address, strips out any special characters in each street address, separates each street address into its tokens, and recognizes these tokens as the following entities:
Parsed Street Address 1: Street_Num=10, Street_name=main, Street_keyword=st, Unit_Name=suite, Unit_Num=220.
Parsed Street Address 2: Street_Num=11, Street_name=main, Street_keyword=st If the parses' confidence scores indicate that the parser parsed both street addresses with sufficiently high parse confidence scores, the adaptive entity recognizer might be inclined to accept these two strings as a sufficiently close fuzzy match because the street names are identical, the street numbers are almost identical, and the tokens Suite, 220 include secondary information.

If a parse's confidence score is lower than the parse confidence threshold, then the parser was not able to parse the string correctly, which occurs frequently with poorly formed street addresses, especially in certain countries such as Turkey. In this situation, the adaptive entity recognizer can resort to unstructured matching to avoid the risk of matching wrongly parsed entities. Unstructured matching uses the raw unparsed strings for matching, which is a fall back option if the parse score is not sufficiently confident that a string was parsed correctly. In this situation, matching on incorrectly parsed structures can produce a worse result than matching on the raw strings. If the adaptive entity recognizer used unstructured matching instead on the Main street example above, the match is less likely to have been accepted because the two raw strings are very different, specifically, the tokens Suite, 220 for Street Address 1 are missing completely from the tokens for Street Address 2. The unstructured match has no way of tolerating these tokens from Street Address 1 that are missing from Street Address 2, unlike the structured matcher which can tolerate these missing tokens.

The adaptive entity recognizer incorporates fuzziness along with domain knowledge. The heuristic probability enables the adaptive entity recognizer to work on the set of all proper nouns (first name or last name in case of person name, street name in case of street address) and thus avoid the maintenance of significantly large training sets. The adaptive entity recognizer is easy to use because it is metadata-driven via an XML configuration file. If certain types of strings such as street addresses or person names need to be parsed, then the corresponding XML configuration file, dictionaries, and pattern sets are created, without writing a single line of code or tuning any parameters. The adaptive entity recognizer's parsing may be easily traced to determine why a certain string was parsed into particular tokens and recognized as specific entities.

FIG. 2 is an operational flow diagram illustrating a high-level overview of a method 200 for adaptive recognition of entities. A prospective record that includes a string is received, and the string is optionally associated with a field that stores a street address, a school name, or a person name, block 202. The adaptive entity recognizer receives a string stored in a prospective record's field. For example, and without limitation, this can include the adaptive entity recognizer receiving a prospective record that includes the string "1 Market St." in the prospective record's street address field.

A string can be a linear sequence of characters, words, symbols, phrases, or other data elements. A prospective record can be at least one stored value that could potentially be stored in a database. A field can be a part of the storage of at least one value in a persistent form, representing an item of data. A street address can be the place where a person or organization is located. A school name can be an identifier of an educational institution. A person name can be an identifier of a human.

After receiving a prospective record that includes a string, the string is separated into a total number of tokens, including a token and another token, and separating the string into the total number of tokens optionally includes converting any uppercase letters in the string to lowercase letters, stripping the string of any special characters, and separating the string into the total number of tokens, block 204. The adaptive entity recognizer parses a string into tokens to be recognized as specific entities. By way of example and without limitation, this can include the adaptive entity recognizer separating the string "1 Market St." into the 3 tokens "1," "market," and "st". Although this example describes the adaptive entity recognizer separating a string into 3 tokens, the adaptive entity recognizer can separate a string into any number of tokens.

A number can be an arithmetical value, expressed by a word, symbol, or figure, representing a particular quantity. A total number can be an aggregated arithmetical value, expressed by a word, symbol, or figure, representing a whole particular quantity. A token can be a word, phrase, symbol, character, or other meaningful element in a text. Uppercase letters can be capitalized or large alphabetic characters. Lowercase letters can be non-capitalized or small alphabetic characters. A special character can be a symbol that is not alphabetic or numerical.

Following the separation of a string into tokens, identifications are made of a pattern that includes an entity, another entity, and a total number of entities that equals the total number of tokens, and another pattern that includes the same total number of entities that equals the total number of tokens, block 206. The adaptive entity recognizer identifies each pattern that includes the number of entities that equal the number of tokens. In embodiments, this can include the adaptive entity recognizer identifying all patterns which include 3 entities that might match the 3 tokens, including pattern 1 (street_number, street_name_word, street_name_word), pattern 2 (street_number, street_name_word, street_keyword), and pattern 3 (street_name_word, street_name_word, street_number). Although this example describes the adaptive entity recognizer identifying 3 patterns that each include 3 entities, the adaptive entity recognizer can identify any number of patterns that each include any number of entities.

A pattern can be an arrangement or sequence regularly found in comparable objects. An entity can be a logical semantic component. A same total number can be an arithmetical value that is identical to another arithmetical value, and is expressed by a word, symbol, or figure, representing a particular quantity.

Having identified patterns of entities that might match the tokens, a combined probability is determined, which combines a probability based on a number of entries in a dictionary which stores the token and is associated with the entity, and another probability based on a number of character types in the other entity that match characters in the other token, block 208. The adaptive entity recognizer determines the match between a pattern's entities and the tokens. For example, and without limitation, this can include the adaptive entity recognizer calculating the probability of pattern 1 as $\{P(1|street\_number)*P(market|street\_name\_word)*P(st|street\_name\_word)\}*(\frac{1}{3})=(\frac{1}{10}\textasciicircum 4*\frac{1}{26}\textasciicircum 4*\frac{1}{26}\textasciicircum 4)*(\frac{1}{3})=1.5962171e-16$. Similarly, the adaptive entity recognizer calculates the probability of pattern 2 as $\{P(1|street\_number)*P(market|street\_name\_word)*P(st|street\_keyword)\}*(\frac{1}{3})=(\frac{1}{10}\textasciicircum 4*\frac{1}{26}\textasciicircum 4*\frac{1}{18})*(\frac{1}{3})$ [The street_keyword dictionary has 18 entries]$=4.0524051e-12$. Likewise, the adaptive entity recognizer calculates the probability of pattern 3 as $\{P(1|street\_name\_word)*P(market|street\_name\_word)*P(st|street\_number)\}*(\frac{1}{3})=(0*\frac{1}{26}\textasciicircum 4*0)*(\frac{1}{3})=0$ [0 is used for street_name_word's entity likelihood because 1 does not match street_name_word, and 0 is used for street_number's entity likelihood because st does not match street_number]

A probability can be a likelihood of something being the case. A combined probability can be merged likelihoods of somethings being the case. An entry can be an item in a list. A dictionary can be a set of values that a token can take. A character can be a symbol. A character type can be a category of symbols having common attributes. A match can be a correspondence in some essential aspect.

The dictionary may be associated with a data provider and another dictionary may be associated with another data provider. For example, the adaptive entity recognizer may use different sets of dictionaries based on whether a dataset's records are received from data.com or Dun & Bradstreet. The other probability based on the number of character types in the other entity that match characters in the other token may be a heuristically determined probability. For example, the entity likelihood that a token is a street name is roughly $\frac{1}{26}\textasciicircum 4$ (0.00000218829), based on the approximation that street names are at least 4 characters long and each character has 26 possible values from a-z. A data provider can be a source of information. A heuristically determined probability can be the likelihood of something being the case, which is discovered by trial and error or by rules that are only loosely defined.

After determining a combined probability, a determination is made whether the combined probability associated with the pattern is greater than another combined probability associated with another pattern, block 210. The adaptive entity recognizer identifies which pattern's entities best match the tokens. By way of example and without limitation, this can include the adaptive entity recognizer determining whether the probability of pattern 1, the probability of pattern 2, or the probability of pattern 3 is the greatest. Although this example describes the adaptive entity recognizer determining which of 3 patterns has the highest probability, the adaptive entity recognizer can determine which of any number of patterns has the highest probability. If the combined probability associated with the pattern is greater than the other combined probability associated with the other pattern, the method 200 continues to block 212 to recognize the tokens as the pattern's entities. If the combined probability associated with the pattern is not greater than the other combined probability associated with the other pattern, the method 200 proceeds to block 214 to recognize the tokens as the other pattern's entities.

Determining whether the combined probability associated with the pattern is greater than the other combined probability associated with the other pattern is optionally based on a weight associated with the pattern and another weight associated with the other pattern. For example, the example calculations above for the record that includes the string "1 Market St." used equal weights of $\frac{1}{3}$ for each of the 3 patterns. If entity recognition errors occur due to pattern 2 being selected too frequently, the weight for pattern 2 may be decreased and/or the weights for the other patterns may be increased. A weight can be a factor associated with one of a set of numerical quantities and used to represent its importance relative to the other numbers of the set.

If the combined probability associated with the pattern is greater than the other combined probability associated with the other pattern, the prospective record is matched to an existing record in the system based on recognizing the token as the entity and the other token as the other entity, block 212. The adaptive entity recognizer identifies matching records based on recognizing the tokens as the best fitting pattern's entities. For example, and without limitation, this can include the adaptive entity recognizer matching the prospective record, which includes "1 Market St." in its street address field, to the master record for salesforce.com, based on recognizing the 3 tokens "1," "market," and "st" as pattern 2's entities (street_number, street_name_word, street_keyword), because the probability of pattern 2 is the largest of the 3 pattern's calculated probabilities. An existing record can be at least one value that is already stored in a database. Matched records can be stored values that correspond to each other in some essential respect.

If the combined probability associated with the pattern is not greater than the other combined probability associated with the other pattern, the prospective record is optionally matched to an existing record in the system based on recognizing the token as an entity associated with the other pattern and the other token as another entity associated with the other pattern, block 214. The adaptive entity recognizer identifies matching records based on recognizing the tokens as the best fitting pattern's entities. For example, and without limitation, this can include the adaptive entity recognizer matching the prospective record that includes "10 Main St. Suite 220" in its street address field to the existing record that includes "11 Main St." in its street address field, based on recognizing the 5 tokens "10," "main," "st," "suite," and "220" as a pattern's entities (street_number, street_name_word, street_keyword, street_unit_keyword, street_unit_number), because the probability of this pattern is the largest of the patterns' calculated probabilities.

The method 200 may be repeated as desired. Although this disclosure describes the blocks 202-214 executing in a particular order, the blocks 202-214 may be executed in a different order. In other implementations, each of the blocks 202-214 may also be executed in combination with other blocks and/or some blocks may be divided into a different set of blocks.

Figure 3F:
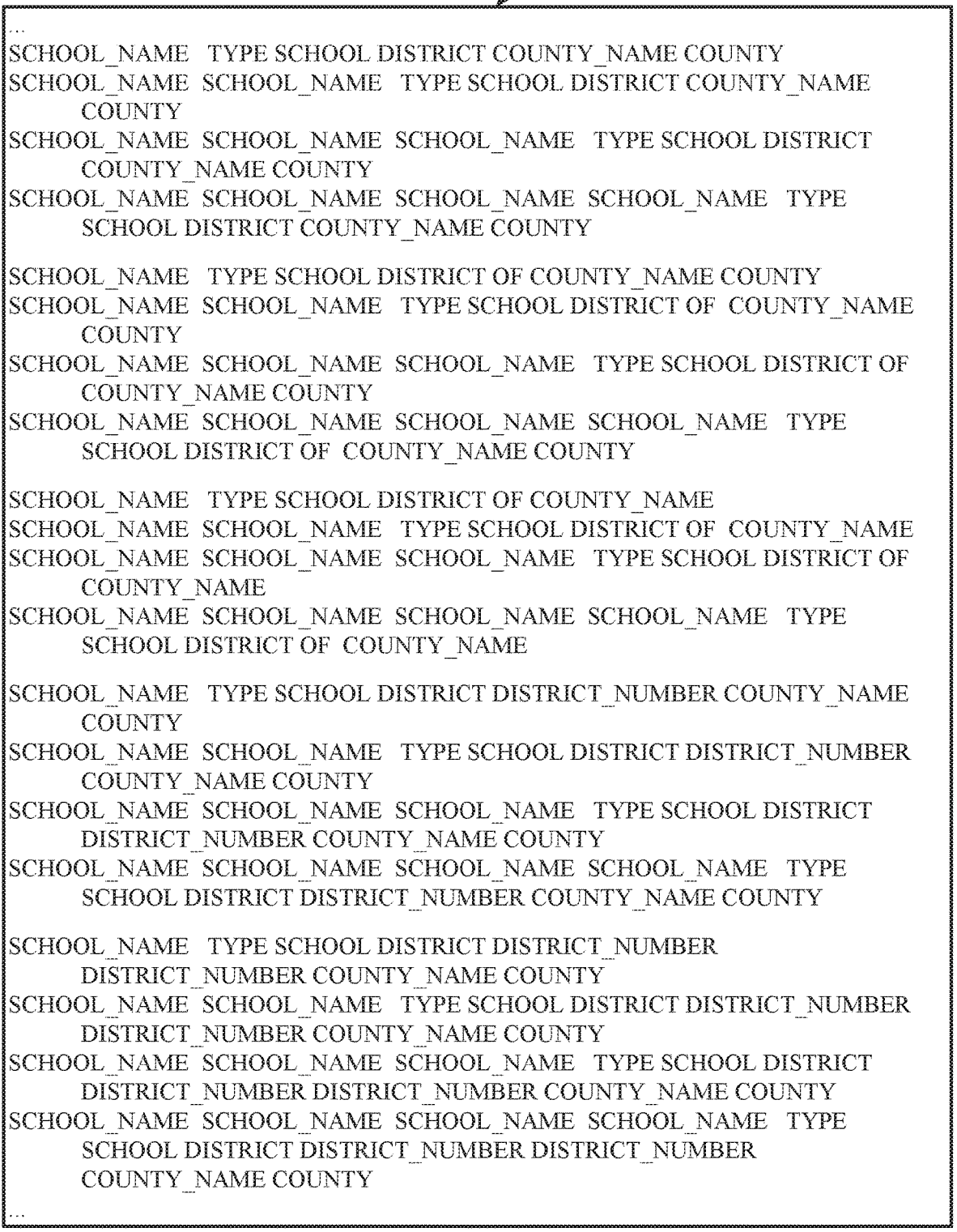
FIGS. 3 A-M illustrate example school name patterns for adaptive recognition of entities, in an embodiment.
Figure 3M:
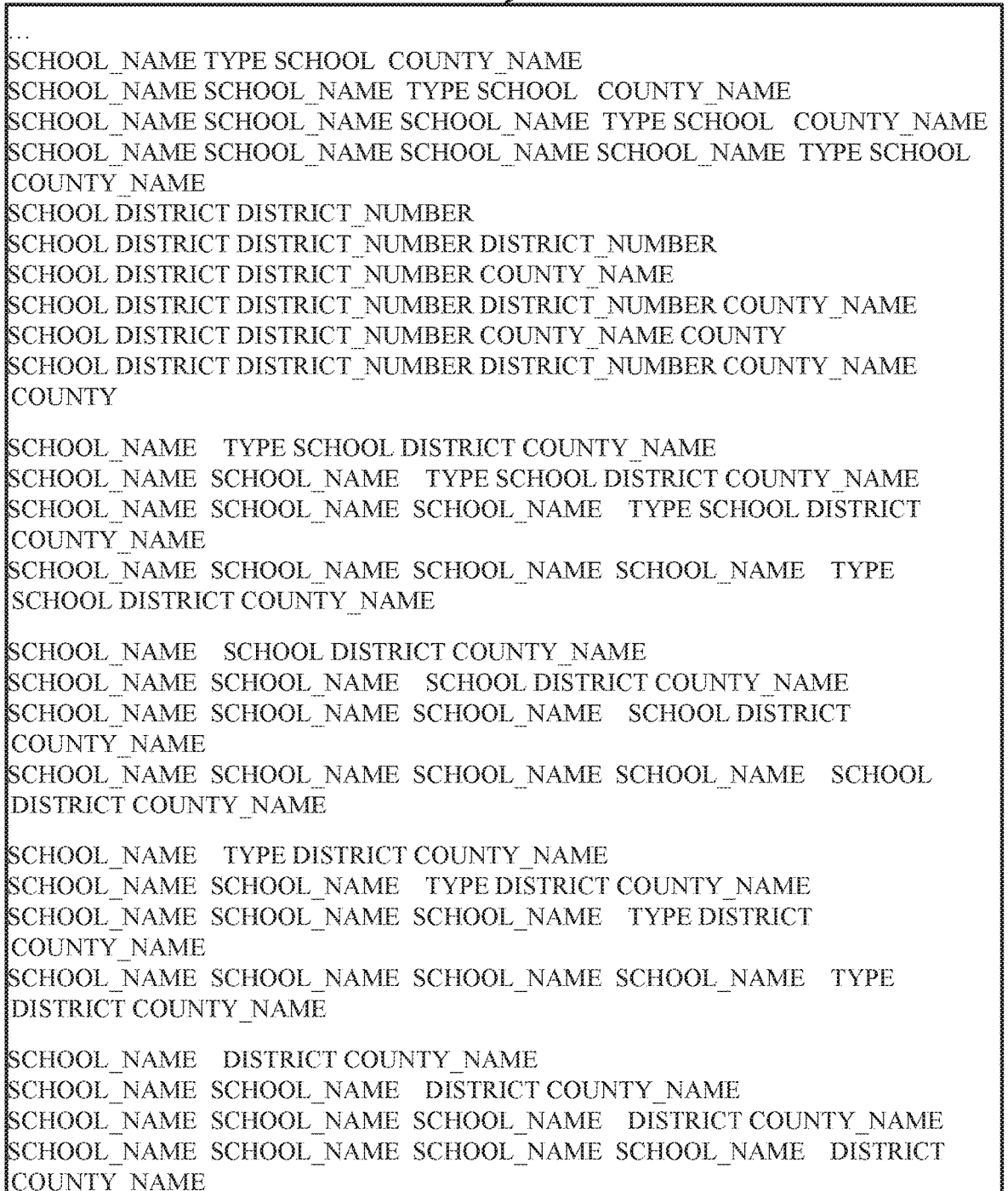
Figure 4:
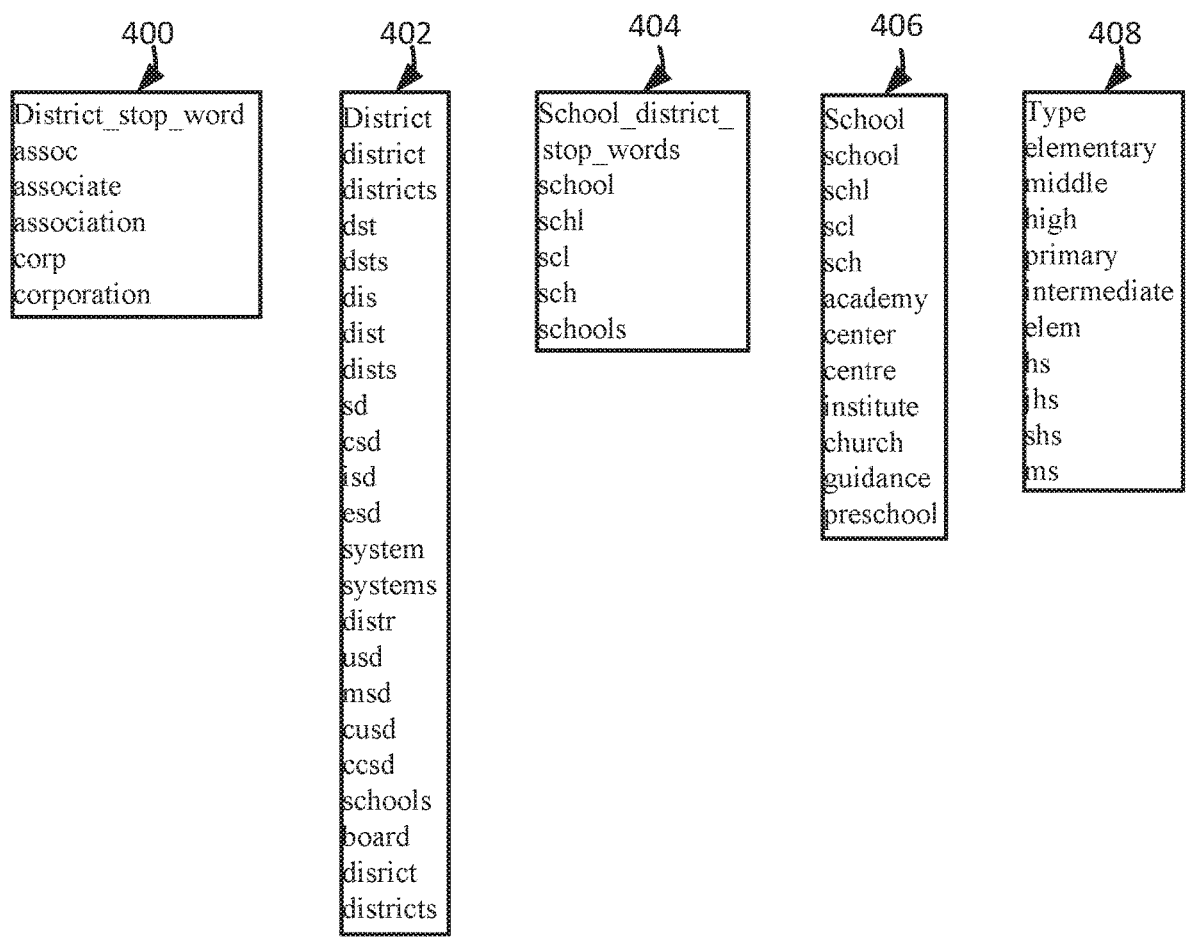
FIG. 4 illustrates example school name dictionaries for adaptive recognition of entities, in an embodiment.
Figure 5A:
FIGS. 5 A-C illustrate an example school name XML configuration file for adaptive recognition of entities, in an embodiment.
Figure 6A:
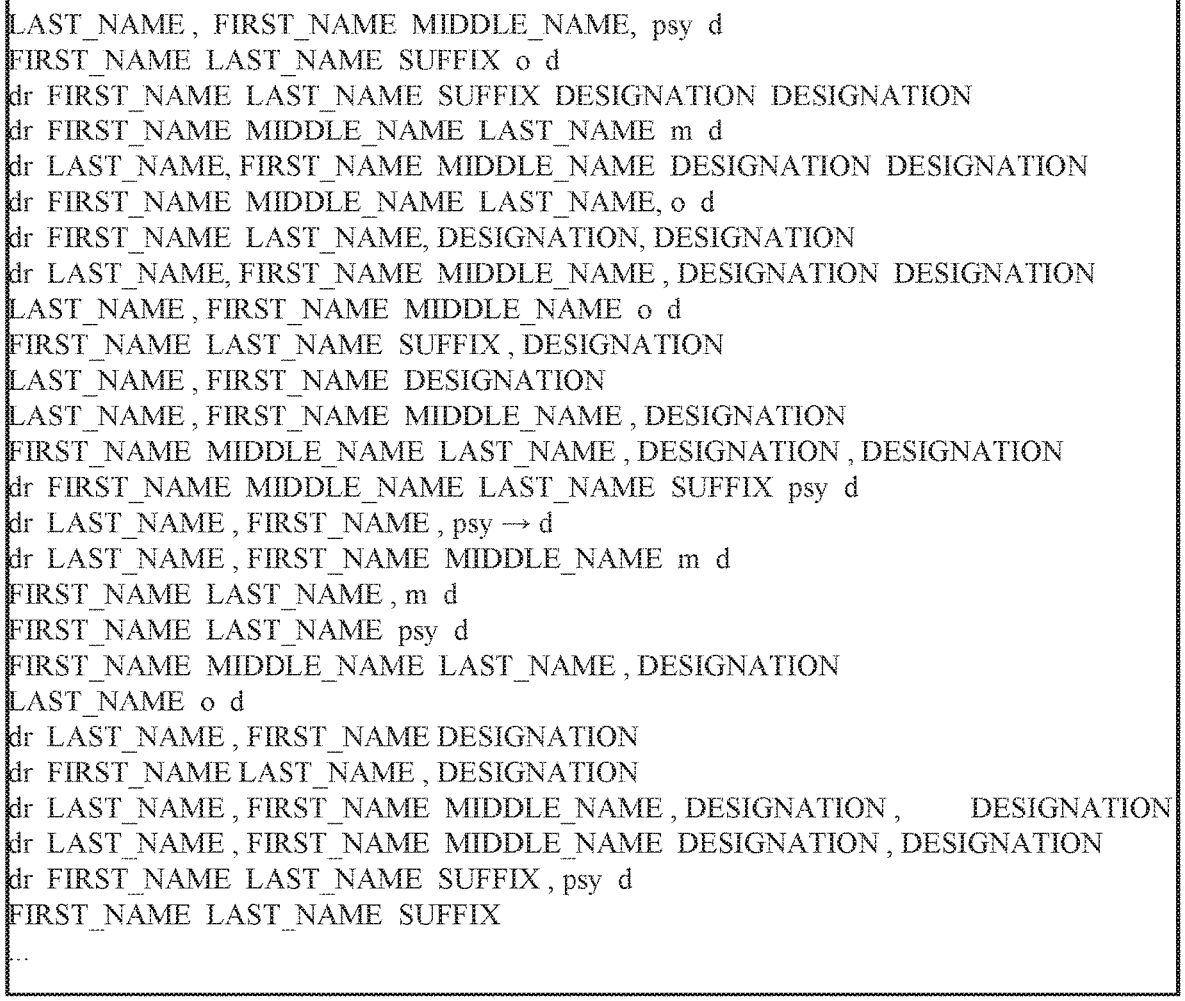
FIGS. 6 A-F illustrate example person name patterns for adaptive recognition of entities, in an embodiment.
Figure 6B:
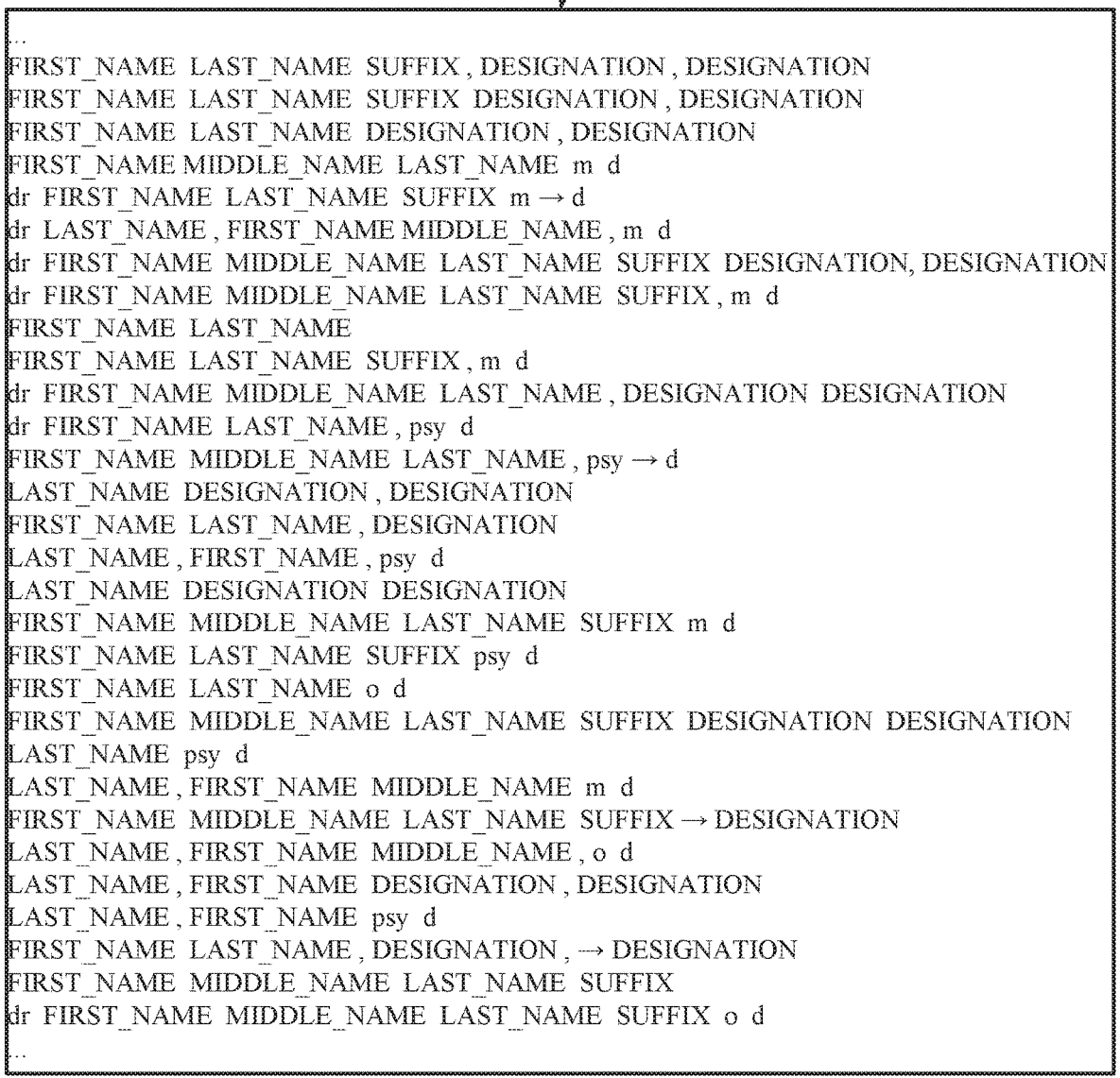
Figure 6D:
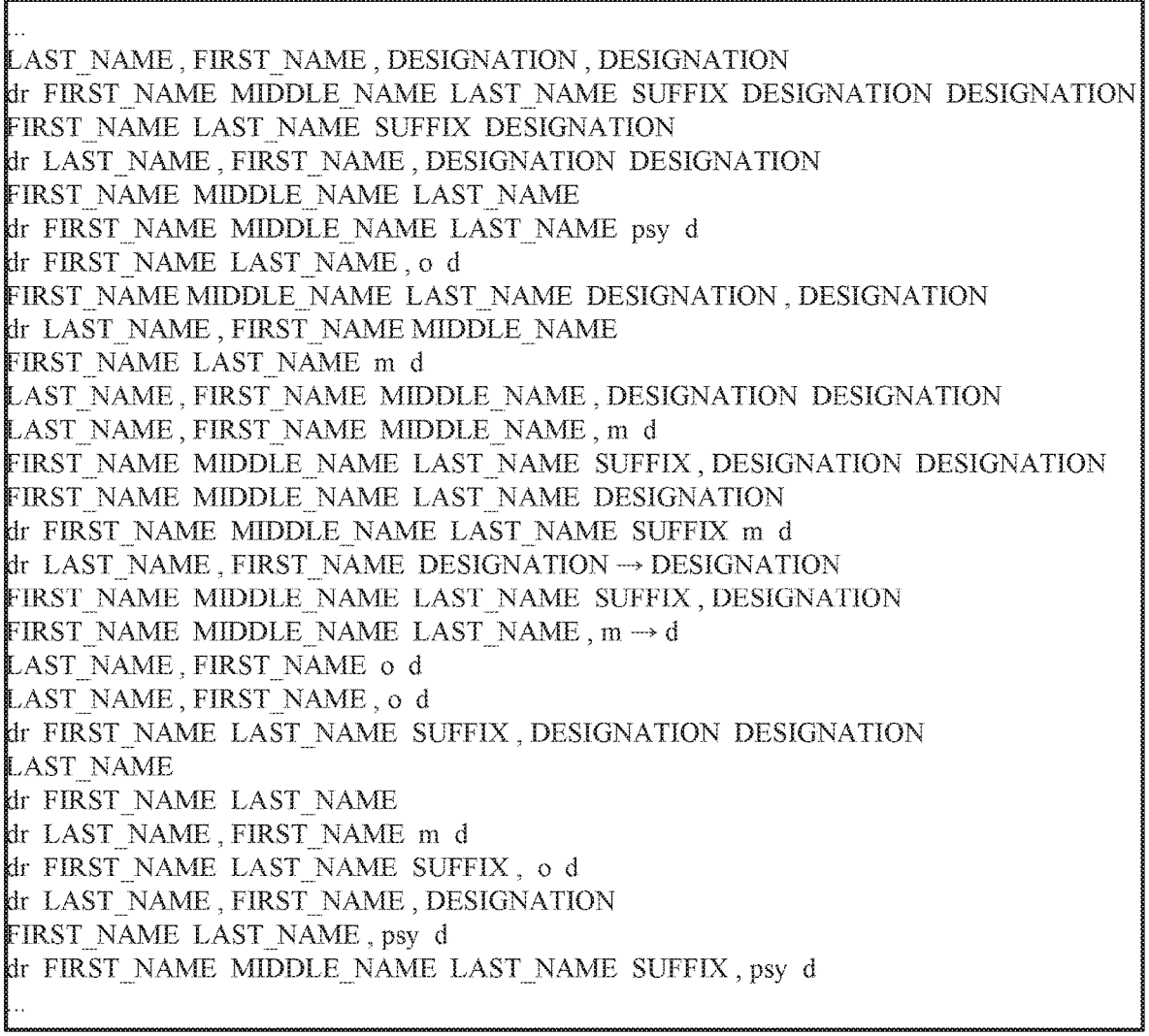
Figure 6F:
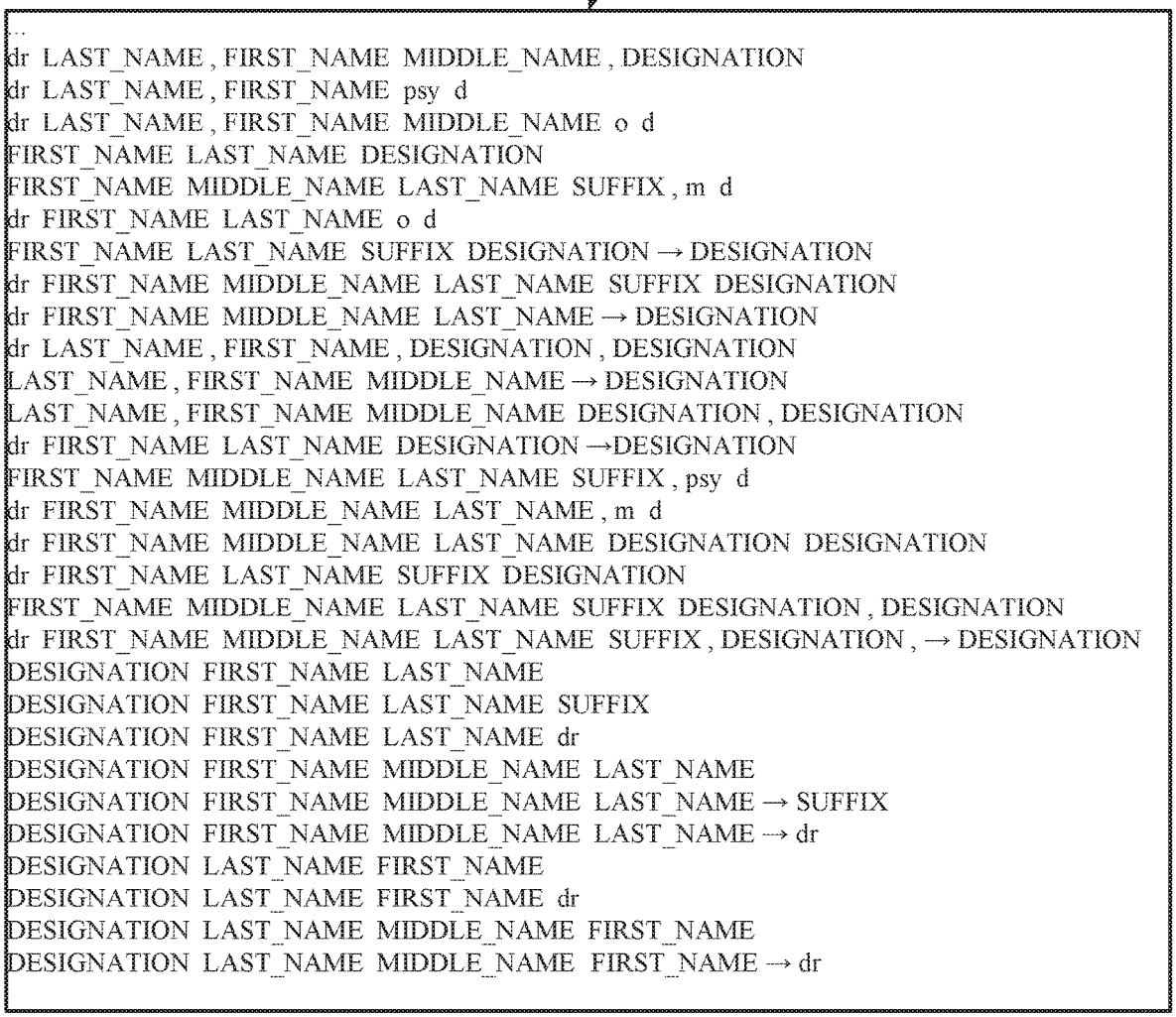

Another use case is a school name parser. The type of schools should match, such as elementary school to elementary school or middle school to middle school. School districts should not match to a particular school name. For example, "Riverside School" should not match to "Riverside School dist 2." When matching two school districts, their names and district numbers should match. For example, "Riverside School dist 2" should match "Riverside district 2." FIGS. 3 A-M illustrate example school name patterns 300 for adaptive recognition of entities, in an embodiment. FIG. 4 illustrates example school name dictionaries 400-408 for adaptive recognition of entities, in an embodiment. FIGS. 5 A-C illustrate an example school name XML configuration file 500 for adaptive recognition of entities, in an embodiment.

Figure 7:
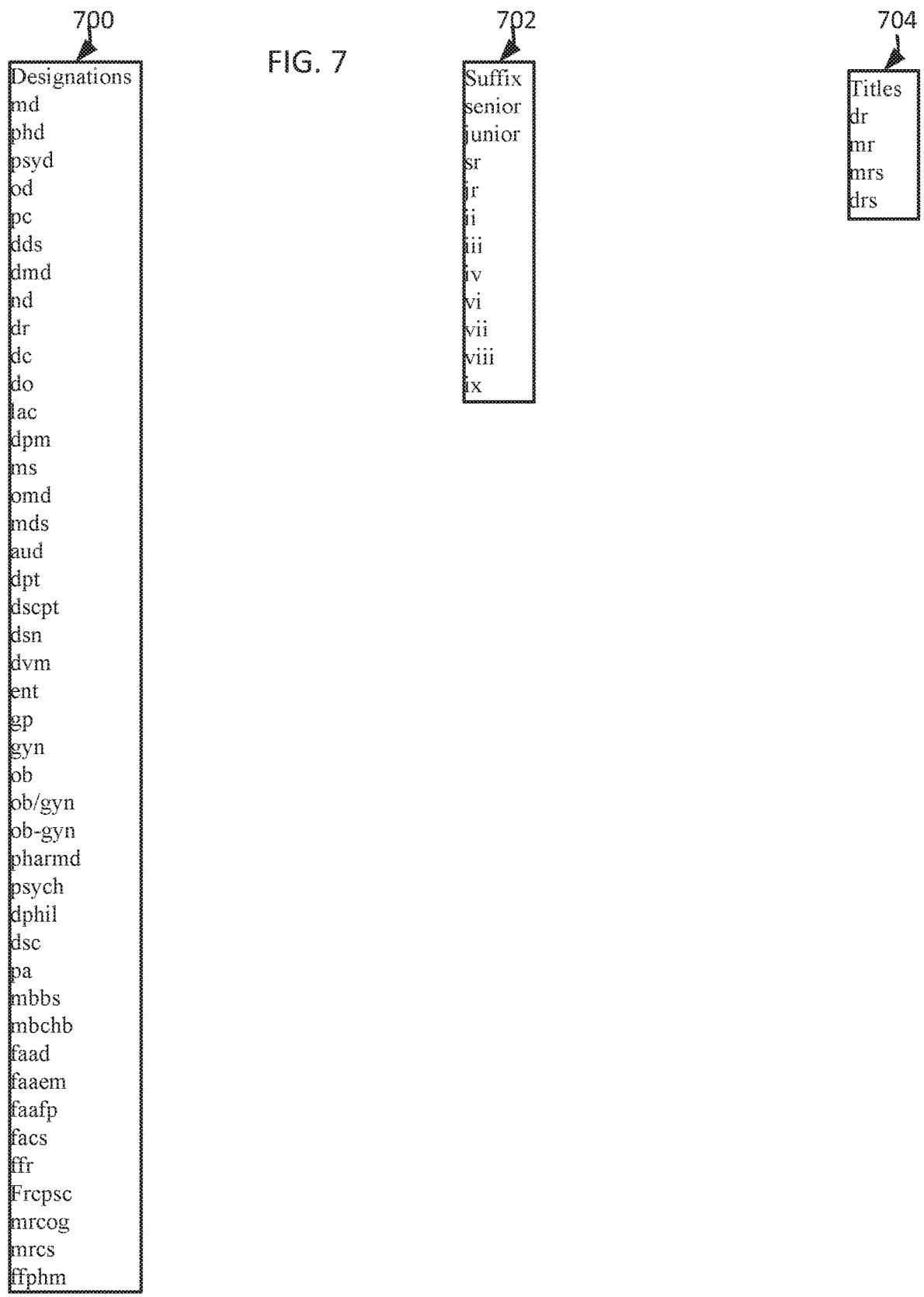
FIG. 7 illustrates example person name dictionaries for adaptive recognition of entities, in an embodiment.

Yet another use case is a person name parser. FIGS. 6 A-F illustrate example person name patterns 600 for adaptive recognition of entities, in an embodiment. FIG. 7 illustrates example person name dictionaries 700-704 for adaptive recognition of entities in an embodiment. FIGS. 8 A-C illustrate an example person name XML configuration file 800 for adaptive recognition of entities, in an embodiment.

System Overview

Figure 9:
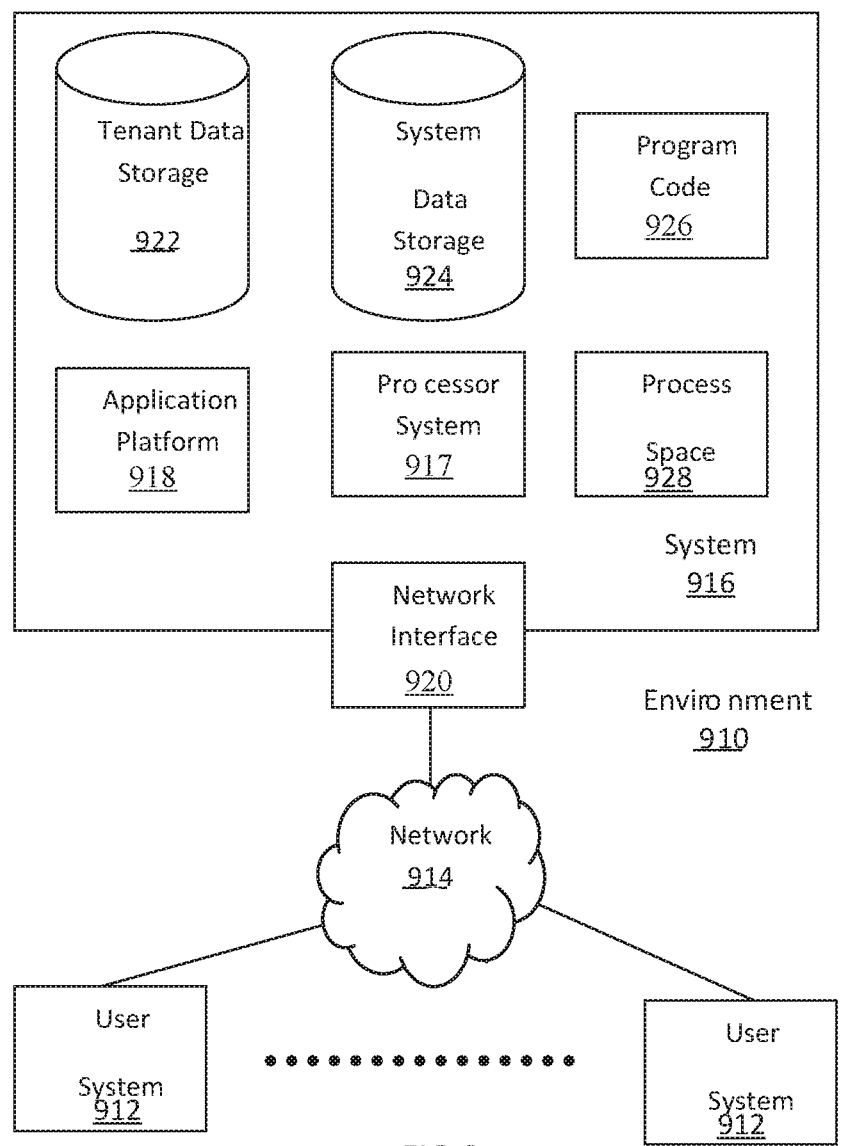
FIG. 9 illustrates a block diagram of an example of an environment wherein an on-demand database service might be used.

FIG. 9 illustrates a block diagram of an environment 910 wherein an on-demand database service might be used. The environment 910 may include user systems 912, a network 914, a system 916, a processor system 917, an application platform 918, a network interface 920, a tenant data storage 922, a system data storage 924, program code 926, and a process space 928. In other embodiments, the environment 910 may not have all of the components listed and/or may have other elements instead of, or in addition to, those listed above.

The environment 910 is an environment in which an on-demand database service exists. A user system 912 may be any machine or system that is used by a user to access a database user system. For example, any of the user systems 912 may be a handheld computing device, a mobile phone, a laptop computer, a workstation, and/or a network of computing devices. As illustrated in FIG. 9 (and in more detail in FIG. 10) the user systems 912 might interact via the network 914 with an on-demand database service, which is the system 916.

An on-demand database service, such as the system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 916" and the "system 916" will be used interchangeably herein. A database image may include one or more database objects. A relational database management system (RDMS) or the equivalent may execute storage and retrieval of information against the database object(s). The application platform 918 may be a framework that allows the applications of the system 916 to run, such as the hardware and/or software, e.g., the operating system. In an embodiment, the on-demand database service 916 may include the application platform 918 which enables creation, managing and executing one or more applications developed by the provider of the on-demand database service, users accessing the on-demand database service via user systems 912, or third party application developers accessing the on-demand database service via the user systems 912.

The users of the user systems 912 may differ in their respective capacities, and the capacity of a particular user system 912 might be entirely determined by permissions (permission levels) for the current user. For example, where a salesperson is using a particular user system 912 to interact with the system 916, that user system 912 has the capacities allotted to that salesperson. However, while an administrator is using that user system 912 to interact with the system 916, that user system 912 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 914 is any network or combination of networks of devices that communicate with one another. For example, the network 914 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 912 might communicate with the system 916 using TCP/IP and, at a higher network level, use other common Internet protocols to communicate, such as HTTP, FTP, AFS, WAP, etc. In an example where HTTP is used, the user systems 912 might include an HTTP client commonly referred to as a "browser" for sending and receiving HTTP messages to and from an HTTP server at the system 916.

Such an HTTP server might be implemented as the sole network interface between the system 916 and the network 914, but other techniques might be used as well or instead. In some implementations, the interface between the system 916 and the network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 916, shown in FIG. 9, implements a web-based customer relationship management (CRM) system. For example, in one embodiment, the system 916 includes application servers configured to implement and execute CRM software applications as well as provide related data, code, forms, webpages and other information to and from the user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 916 implements applications other than, or in addition to, a CRM application. For example, the system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of the system 916 is shown in FIG. 9, including the network interface 920, the application platform 918, the tenant data storage 922 for tenant data 923, the system data storage 924 for system data 925 accessible to the system 916 and possibly multiple tenants, the program code 926 for implementing various functions of the system 916, and the process space 928 for executing MTS system processes and tenant-specific processes, such as running applications as part of an application hosting service. Additional processes that may execute on the system 916 include database indexing processes.

Several elements in the system shown in FIG. 9 include conventional, well-known elements that are explained only briefly here. For example, each of the user systems 912 could include a desktop personal computer, workstation, laptop, PDA, cell phone, or any wireless access protocol (WAP) enabled device or any other computing device capable of interfacing directly or indirectly to the Internet or other network connection. Each of the user systems 912 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 912 to access, process and view information, pages and applications available to it from the system 916 over the network 914. Each of the user systems 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 916 or other systems or servers. For example, the user interface device may be used to access data and applications hosted by the system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 912 and all of its components are operator configurable using applications, such as a browser, including computer code run using a central processing unit such as an Intel Pentium® processor or the like. Similarly, the system 916 (and additional instances of an MTS, where more than one is present) and all of their components might be operator configurable using application(s) including computer code to run using a central processing unit such as the processor system 917, which may include an Intel Pentium® processor or the like, and/or multiple processor units. A computer program product embodiment includes a machine-readable storage medium (media) having instructions stored thereon/ in which may be used to program a computer to perform any of the processes of the embodiments described herein. Computer code for operating and configuring the system 916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/ IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 916 is configured to provide webpages, forms, applications, data and media content to the user (client) systems 912 to support the access by the user systems 912 as tenants of the system 916. As such, the system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 10:
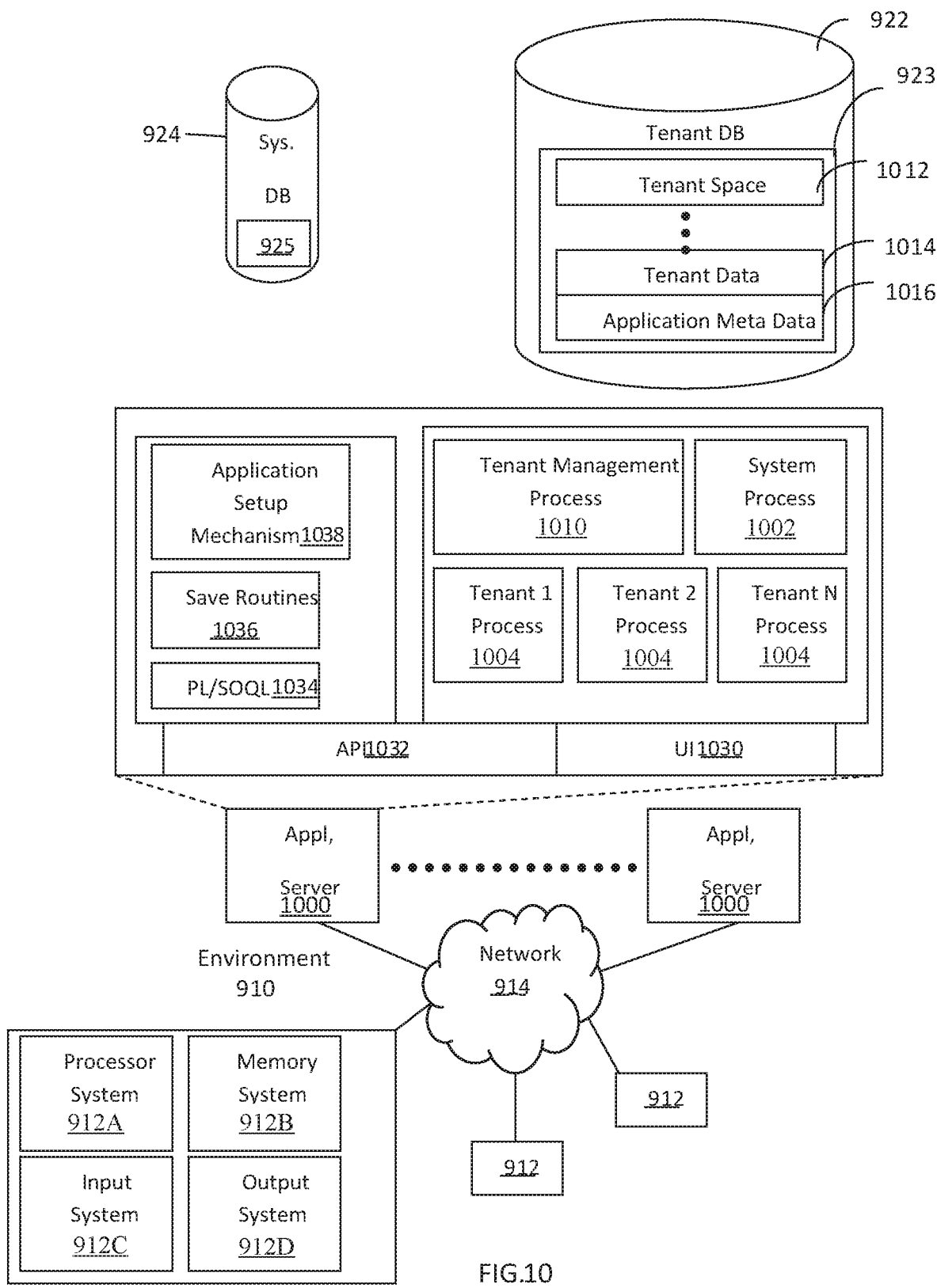
FIG. 10 illustrates a block diagram of an embodiment of elements of FIG. 9 and various possible interconnections between these elements.

FIG. 10 also illustrates the environment 910. However, in FIG. 10 elements of the system 916 and various interconnections in an embodiment are further illustrated. FIG. 10 shows that the each of the user systems 912 may include a processor system 912A, a memory system 912B, an input system 912C, and an output system 912D. FIG. 10 shows the network 914 and the system 916. FIG. 10 also shows that the system 916 may include the tenant data storage 922, the tenant data 923, the system data storage 924, the system data 925, a User Interface (UI) 1030, an Application Program Interface (API) 1032, a PL/SOQL 1034, save routines 1036, an application setup mechanism 1038, applications servers $1000_1$-$1000_N$, a system process space 1002, tenant process spaces 1004, a tenant management process space 1010, a tenant storage area 1012, a user storage 1014, and application metadata 1016. In other embodiments, the environment 910 may not have the same elements as those listed above and/or may have other elements instead of, or in addition to, those listed above.

The user systems 912, the network 914, the system 916, the tenant data storage 922, and the system data storage 924 were discussed above in FIG. 9. Regarding the user systems 912, the processor system 912A may be any combination of one or more processors. The memory system 912B may be any combination of one or more memory devices, short term, and/or long-term memory. The input system 912C may be any combination of input devices, such as one or more keyboards, mice, trackballs, scanners, cameras, and/or interfaces to networks. The output system 912D may be any combination of output devices, such as one or more monitors, printers, and/or interfaces to networks. As shown by FIG. 10, the system 916 may include the network interface 920 (of FIG. 9) implemented as a set of HTTP application servers 1000, the application platform 918, the tenant data storage 922, and the system data storage 924. Also shown is the system process space 1002, including individual tenant process spaces 1004 and the tenant management process space 1010. Each application server 1000 may be configured to access tenant data storage 922 and the tenant data 923 therein, and the system data storage 924 and the system data 925 therein to serve requests of the user systems 912. The tenant data 923 might be divided into individual tenant storage areas 1012, which may be either a physical arrangement and/or a logical arrangement of data. Within each tenant storage area 1012, the user storage 1014 and the application metadata 1016 might be similarly allocated for each user. For example, a copy of a user's most recently used (MRU) items might be stored to the user storage 1014. Similarly, a copy of MRU items for an entire organization that is a tenant might be stored to the tenant storage area 1012. The UI 1030 provides a user interface and the API 1032 provides an application programmer interface to the system 916 resident processes to users and/or developers at the user systems 912. The tenant data and the system data may be stored in various databases, such as one or more Oracle™ databases.

The application platform 918 includes the application setup mechanism 1038 that supports application developers' creation and management of applications, which may be saved as metadata into the tenant data storage 922 by the save routines 1036 for execution by subscribers as one or more tenant process spaces 1004 managed by the tenant management process 1010 for example. Invocations to such applications may be coded using the PL/SOQL 1034 that provides a programming language style interface extension to the API 1032. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 1016 for the subscriber making the invocation and executing the metadata as an application in a virtual machine.

Each application server 1000 may be communicably coupled to database systems, e.g., having access to the system data 925 and the tenant data 923, via a different network connection. For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also may be used. For example, in certain embodiments, three consecutive requests from the same user could hit three different application servers 1000, and three requests from different users could hit the same application server 1000. In this manner, the system 916 is multi-tenant, wherein the system 916 handles storage of, and access to, different objects, data and applications across disparate users and organizations.

As an example of storage, one tenant might be a company that employs a sales force where each salesperson uses the system 916 to manage their sales process. Thus, a user might maintain contact data, leads data, customer follow-up data, performance data, goals and progress data, etc., all applicable to that user's personal sales process (e.g., in the tenant data storage 922). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 916 might also maintain system level data usable by multiple tenants or other data. Such system level data might include industry reports, news, postings, and the like that are sharable among tenants.

In certain embodiments, the user systems 912 (which may be client systems) communicate with the application servers 1000 to request and update system-level and tenant-level data from the system 916 that may require sending one or more queries to the tenant data storage 922 and/or the system data storage 924. The system 916 (e.g., an application server 1000 in the system 916) automatically generates one or more SQL statements (e.g., one or more SQL queries) that are designed to access the desired information. The system data storage 924 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for adaptive recognition of entities, the system comprising:
   one or more processors; and
   a non-transitory computer readable medium storing a plurality of instructions, which when executed, cause the one or more processors to:
   separate a string of characters into tokens, including at least a first token and a second token, in response to receiving a record comprising the string of characters;
   identify a plurality of sequential patterns of entities that each have a total number of entities that equals a total number of tokens in the string of characters in the received record, the plurality of sequential patterns of entities including at least a first sequential pattern of entities comprising at least a first entity and a second entity, and a second sequential pattern of entities comprising at least the first entity and a third entity;
   determine a first combined probability that combines a first probability based on a number of a character type in the first entity that match a character type in the first token, and a second probability based on a number of a character type in the second entity, in the first sequential pattern of entities, that match a character type in the second token;
   determine a second combined probability that combines the first probability based on the number of the character type in the first entity that match the character type in the first token, and a second probability based on a number of entries in a dictionary which stores the second token and is associated with the third entity in the second sequential pattern of entities;
   determine whether the first combined probability is greater than the second combined probability; and
   match the record to an existing record in the system based on recognizing the first token as the first entity and the second token as the third entity, in response to a determination that the first combined probability is less than the second combined probability.

2. The system of claim 1, wherein the string of characters is associated with a field that stores one of a street address, a school name, and a person name.

3. The system of claim 1, wherein separating the string of characters into the tokens comprises converting any uppercase letters in the string of characters to lowercase letters, and stripping the string of characters of any special characters.

4. The system of claim 1, wherein the dictionary is associated with a first data provider and another dictionary is associated with a second data provider.

5. The system of claim 1, wherein the second probability based on the number of the character type in the second entity that match the character type in the second token comprises a heuristically determined probability.

6. The system of claim 1, wherein determining whether the first combined probability is greater than the second combined probability is based on a first weight associated with the first sequential pattern of entities and a second weight associated with the second sequential pattern of entities.

7. The system of claim 1, wherein the plurality of instructions further causes the processor to match the record to an existing record in the system based on recognizing the first token as a first entity associated with the second sequential pattern of entities and the second token as a second entity associated with the second sequential pattern of entities, in response to a determination that the first combined probability is not greater than the second combined probability.

8. A computer program product comprising a non-transitory computer-readable medium having computer-readable program code embodied therein to be executed by one or more processors, the program code including instructions to:
separate a string of characters into tokens, including at least a first token and a second token, in response to receiving a record comprising the string of characters;
identify a plurality of sequential patterns of entities that each have a total number of entities that equals a total number of tokens in the string of characters in the received record, the plurality of sequential patterns of entities including at least a first sequential pattern of entities comprising at least a first entity and a second entity, and a second sequential pattern of entities comprising at least the first entity and a third entity;
determine a first combined probability that combines a first probability based on a number of a character type in the first entity that match a character type in the first token, and a second probability based on a number of a character type in the second entity, in the first sequential pattern of entities, that match a character type in the second token;
determine a second combined probability that combines the first probability based on the number of the character type in the first entity that match the character type in the first token, and a second probability based on a number of entries in a dictionary which stores the second token and is associated with the third entity in the second sequential pattern of entities;
determine whether the first combined probability is greater than the second combined probability; and
match the record to an existing record in the system based on recognizing the first token as the first entity and the second token as the third entity, in response to a determination that the first combined probability is less than the second combined probability.

9. The computer program product of claim 8, wherein the string of characters is associated with a field that stores one of a street address, a school name, and a person name.

10. The computer program product of claim 8, wherein separating the string of characters into the tokens comprises converting any uppercase letters in the string of characters to lowercase letters, and stripping the string of characters of any special characters.

11. The computer program product of claim 8, wherein the dictionary is associated with a first data provider and another dictionary is associated with a second data provider.

12. The computer program product of claim 8, wherein the second probability based on the number of the character type in the second entity that match the character type in the second token comprises a heuristically determined probability.

13. The computer program product of claim 8, determining whether the first combined probability is greater than the second combined probability is based on a first weight associated with the first sequential pattern of entities and a second weight associated with the second sequential pattern of entities.

14. The computer program product of claim 8, wherein the plurality of instructions further causes the processor to match the record to an existing record in the system based on recognizing the first token as a first entity associated with the second sequential pattern of entities and the second token as a second entity associated with the second sequential pattern of entities, in response to a determination that the first combined probability is not greater than the second combined probability.

15. A computer-implemented method for adaptive recognition of entities, the computer-implemented method comprising:
separating a string of characters into tokens, including at least a first token and a second token, in response to receiving a record comprising the string of characters;
identifying a plurality of sequential patterns of entities that each have a total number of entities that equals a total number of tokens in the string of characters in the received record, the plurality of sequential patterns of entities including at least a first sequential pattern of entities comprising at least a first entity and a second entity, and a second sequential pattern of entities comprising at least the first entity and a third entity;
determining a first combined probability that combines a first probability based on a number of a character type in the first entity that match a character type in the first token, and a second probability based on a number of a character type in the second entity, in the first sequential pattern of entities, that match a character type in the second token;
determining a second combined probability that combines the first probability based on the number of the character type in the first entity that match the character type in the first token, and a second probability based on a number of entries in a dictionary which stores the second token and is associated with the third entity in the second sequential pattern of entities;
determining whether the first combined probability is greater than the second combined probability; and
matching the record to an existing record in the system based on recognizing the first token as the first entity and the second token as the third entity, in response to a determination that the first combined probability is less than the second combined probability.

16. The computer-implemented method of claim 15, wherein the string of characters is associated with a field that stores one of a street address, a school name, and a person name, and separating the string of characters into the tokens comprises converting any uppercase letters in the string of characters to lowercase letters, and stripping the string of characters of any special characters.

17. The computer-implemented method of claim 15, wherein the dictionary is associated with a first data provider and another dictionary is associated with a second data provider.

18. The computer-implemented method of claim 15, wherein the second probability based on the number of the character type in the second entity that match the character type in the second token comprises a heuristically determined probability.

19. The computer-implemented method of claim 15, wherein determining whether the first combined probability is greater than the second combined probability is based on a first weight associated with the first sequential pattern of entities and a second weight associated with the second sequential pattern of entities.

20. The computer-implemented method of claim 15, wherein the plurality of instructions further causes the processor to match the record to an existing record in the system based on recognizing the first token as a first entity associated with the second sequential pattern of entities and the second token as a second entity associated with the second sequential pattern of entities, in response to a determination that the first combined probability is not greater than the second combined probability.

\* \* \* \* \*